(12) United States Patent
Zhou et al.

(10) Patent No.: US 11,962,424 B2
(45) Date of Patent: Apr. 16, 2024

(54) RELAY DESIGN FOR SIDELINK COMMUNICATIONS USING NETWORK CODING

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/376,527

(22) Filed: Jul. 15, 2021

(65) Prior Publication Data

US 2022/0021491 A1 Jan. 20, 2022

Related U.S. Application Data

(60) Provisional application No. 63/052,871, filed on Jul. 16, 2020.

(51) Int. Cl.
*H04W 72/04* (2023.01)
*H04L 1/1812* (2023.01)
(Continued)

(52) U.S. Cl.
CPC .......... *H04L 1/1896* (2013.01); *H04L 1/1819* (2013.01); *H04L 1/189* (2013.01); *H04W 92/18* (2013.01)

(58) Field of Classification Search
CPC ..... H04L 1/1819; H04L 1/189; H04L 1/1896; H04L 1/0026; H04L 1/0076;
(Continued)

(56) References Cited

U.S. PATENT DOCUMENTS 9,648,599 B2 * 5/2017 Sartori .............. H04W 72/0413
10,291,364 B2 * 5/2019 Wakabayashi .......... H04L 5/001
(Continued)

OTHER PUBLICATIONS

International Search Report and Written Opinion—PCT/US2021/042011—ISA/EPO—dated Oct. 18, 2021.

*Primary Examiner* — Phuc H Tran
(74) *Attorney, Agent, or Firm* — Holland & Hart LLP

(57) ABSTRACT

Methods, systems, and devices for wireless communications are described in which sidelink communications between devices may be retransmitted using one or more nodes. A first user equipment (UE) may transmit a broadcast, multicast, or groupcast communication to a set of other UEs using sidelink resources. A node may monitor the communications and store the first UE transmission. UEs of the set of other UEs may transmit feedback reports to the node that indicate one or more missing packets of the first UE transmission. The node may retransmit one or more of the stored packets to the set of other UEs based on the feedback reports. In some cases, the sidelink communications may be encoded using a network coding algorithm, and the node may retransmit network coded packets based on the feedback reports, may transmit newly encoded packets based on the feedback reports, or combinations thereof.

30 Claims, 18 Drawing Sheets

(51) Int. Cl.
*H04L 1/1867* (2023.01)
*H04W 92/18* (2009.01)

(58) Field of Classification Search
CPC ......... H04L 1/1671; H04L 2001/0097; H04W 92/18; H04W 4/40; H04W 4/70; F26B 5/005; H01L 21/67034; H01L 21/67109; H01L 21/67126
See application file for complete search history.

(56) References Cited

U.S. PATENT DOCUMENTS

| | | | |
|---|---|---|---|
| 11,388,558 B2* | 7/2022 | Kalhan | H04W 4/70 |
| 2007/0280233 A1* | 12/2007 | Bush | G06F 16/215 |
| | | | 370/390 |
| 2012/0327760 A1* | 12/2012 | Du | H04L 1/1887 |
| | | | 370/242 |
| 2014/0177449 A1* | 6/2014 | Novak | H04W 4/80 |
| | | | 370/329 |
| 2015/0208381 A1* | 7/2015 | Fujishiro | H04L 5/0032 |
| | | | 455/450 |
| 2016/0021566 A1* | 1/2016 | Kimura | H04W 28/06 |
| | | | 370/329 |
| 2016/0227463 A1* | 8/2016 | Baligh | H04W 40/02 |
| 2017/0290034 A1* | 10/2017 | Desai | H04W 4/029 |
| 2019/0364590 A1* | 11/2019 | Sartori | H04W 72/23 |
| 2020/0022013 A1* | 1/2020 | Nguyen | H04B 7/15521 |
| 2020/0275412 A1* | 8/2020 | Kim | H04L 1/1819 |
| 2021/0227508 A1* | 7/2021 | Lee | H04W 72/042 |
| 2021/0289380 A1* | 9/2021 | Chae | H04W 24/10 |
| 2021/0336728 A1* | 10/2021 | Selvanesan | H04L 1/1861 |

\* cited by examiner

RELAY DESIGN FOR SIDELINK COMMUNICATIONS USING NETWORK CODING

CROSS REFERENCE

The present Application for Patent claims the benefit of U.S. Provisional Patent Application No. 63/052,871 by Zhou et al., entitled "RELAY DESIGN FOR SIDELINK BROADCASTING USING NETWORK CODING," filed Jul. 16, 2020, assigned to the assignee hereof, and expressly incorporated by reference herein.

INTRODUCTION

The following relates to wireless communications, including relay design for sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support relay design for sidelink communications using network coding. For example, the sidelink communications may include using a broadcast transmission technique, a multicast transmission technique, or a groupcast transmission technique.

A method of wireless communication at a second user equipment (UE) is described. The method may include receiving, from a first UE, a first subset of network coded packets in a first sidelink communication, determining feedback for the first subset of network coded packets that indicates unsuccessful receipt of at least a first packet at the second UE, transmitting, to a node, a feedback report that indicates a negative acknowledgment for the first packet, and receiving a transmission from the node that provides information associated with the first packet.

An apparatus for wireless communication at a second UE is described. The apparatus may include a processor and memory coupled with the processor. The processor and memory may be configured to receive, from a first UE, a first subset of network coded packets in a first sidelink communication, determine feedback for the first subset of network coded packets that indicates unsuccessful receipt of at least a first packet at the second UE, transmit, to a node, a feedback report that indicates a negative acknowledgment for the first packet, and receive a transmission from the node that provides information associated with the first packet. In some cases, the first sidelink communication includes at least one of a sidelink broadcast communication, a sidelink multicast communication, or a sidelink groupcast communication.

Another apparatus for wireless communication at a second UE is described. The apparatus may include means for receiving, from a first UE, a first subset of network coded packets in a first sidelink communication, determining feedback for the first subset of network coded packets that indicates unsuccessful receipt of at least a first packet at the second UE, transmitting, to a node, a feedback report that indicates a negative acknowledgment for the first packet, and receiving a transmission from the node that provides information associated with the first packet. In some cases, the first sidelink communication includes at least one of a sidelink broadcast communication, a sidelink multicast communication, or a sidelink groupcast communication.

A non-transitory computer-readable medium storing code for wireless communication at a second UE is described. The code may include instructions executable by a processor to receive, from a first UE, a first subset of network coded packets in a first sidelink communication, determine feedback for the first subset of network coded packets that indicates unsuccessful receipt of at least a first packet at the second UE, transmit, to a node, a feedback report that indicates a negative acknowledgment for the first packet, and receive a transmission from the node that provides information associated with the first packet. In some cases, the first sidelink communication includes at least one of a sidelink broadcast communication, a sidelink multicast communication, or a sidelink groupcast communication.

Some examples of the method, apparatuses, and non-transitory computer-readable medium described herein may further include operations, features, means, or instructions for transmitting channel information associated with the second UE with the feedback report to the node. In some examples of the method, apparatuses, and non-transitory computer-readable medium described herein, the channel information may be determined based on one or more of a channel state information reference signal or a demodulation reference signal transmitted by the first UE. In some examples of the method, apparatuses, and non-transitory computer-readable medium described herein, the transmitting the feedback report may include operations, features, means, or instructions for transmitting one or more of a packet data convergence protocol (PDCP) status report, a radio link control (RLC) status report, a medium access control (MAC) hybrid acknowledgment repeat request (HARQ) feedback transmission, or any combinations thereof.

Some examples of the method, apparatuses, and non-transitory computer-readable medium described herein may further include operations, features, means, or instructions for receiving, from a base station, configuration information indicates one or more of a network coding algorithm for the network coded packets, an encoding function or matrix for the network coded packets, a number of decoding iterations that are performed for the network coded packets, a timing synchronization for sidelink communications, or any combinations thereof. In some examples of the method, apparatuses, and non-transitory computer-readable medium described herein, the configuration information may be provided by the base station via one or more of radio resource control (RRC) signaling, a MAC control element (MAC-CE), downlink control information (DCI), or any combinations thereof. In some examples of the method, apparatuses, and non-transitory computer-readable medium described herein, the node may be a roadside unit (RSU) in a cellular vehicle-to-everything (C-V2X) sidelink communication system.

In some examples of the method, apparatuses, and non-transitory computer-readable medium described herein, the first packet may be a network coded packet, and where the transmission from the node is a retransmission of the network coded packet. Some examples of the method, apparatuses, and non-transitory computer-readable medium described herein may further include operations, features, means, or instructions for decoding one or more source packets based on a network coding algorithm and the received first subset of network coded packets. In some examples of the method, apparatuses, and non-transitory computer-readable medium described herein, the receiving the transmission from the node may include operations, features, means, or instructions for receiving one or more new network coded packets, and decoding the first packet based on a network coding algorithm used to encode the first subset of network coded packets and the one or more new network coded packets.

Some examples of the method, apparatuses, and non-transitory computer-readable medium described herein may further include operations, features, means, or instructions for receiving, from the first UE, a second subset of network coded packets in a second sidelink communication, determining feedback for the transmission from the node and the second sidelink communication, and transmitting, to the node, a subsequent feedback report based on the feedback for the transmission from the node and the second sidelink communication. In some cases, the second sidelink communication includes at least one of a sidelink broadcast communication, a sidelink multicast communication, or a sidelink groupcast communication. In some examples of the method, apparatuses, and non-transitory computer-readable medium described herein, the first packet may be a network coded packet, and where the transmission from the node includes one or more new network coded packets that include one or more source packets associated with the first packet based on a network coding algorithm to encode the one or more source packets.

A method of wireless communication at a node is described. The method may include receiving, from a first UE of a set of UEs configured for UE-to-UE sidelink communications, a first subset of network coded packets in a first sidelink communication that is transmitted from the first UE to other UEs of the set of UEs, receiving, from a second UE of the set of UEs, a feedback report for the first subset of network coded packets that indicates unsuccessful receipt of at least a first packet at the second UE, and transmitting, responsive to the feedback report, a second communication to the second UE that includes information associated with the first packet. In some cases, the first sidelink communication includes at least one of a sidelink broadcast communication, a sidelink multicast communication, or a sidelink groupcast communication.

An apparatus for wireless communication at a node is described. The apparatus may include a processor and memory coupled with the processor. The processor and memory may be configured to receive, from a first UE of a set of UEs configured for UE-to-UE sidelink communications, a first subset of network coded packets in a first sidelink communication that is transmitted from the first UE to other UEs of the set of UEs, receive, from a second UE of the set of UEs, a feedback report for the first subset of network coded packets that indicates unsuccessful receipt of at least a first packet at the second UE, and transmit, responsive to the feedback report, a second communication to the second UE that includes information associated with the first packet. In some cases, the first sidelink communication includes at least one of a sidelink broadcast communication, a sidelink multicast communication, or a sidelink groupcast communication.

Another apparatus for wireless communication at a node is described. The apparatus may include means for receiving, from a first UE of a set of UEs configured for UE-to-UE sidelink communications, a first subset of network coded packets in a first sidelink communication that is transmitted from the first UE to other UEs of the set of UEs, receiving, from a second UE of the set of UEs, a feedback report for the first subset of network coded packets that indicates unsuccessful receipt of at least a first packet at the second UE, and transmitting, responsive to the feedback report, a second communication to the second UE that includes information associated with the first packet. In some cases, the first sidelink communication includes at least one of a sidelink broadcast communication, a sidelink multicast communication, or a sidelink groupcast communication.

A non-transitory computer-readable medium storing code for wireless communication at a node is described. The code may include instructions executable by a processor to receive, from a first UE of a set of UEs configured for UE-to-UE sidelink communications, a first subset of network coded packets in a first sidelink communication that is transmitted from the first UE to other UEs of the set of UEs, receive, from a second UE of the set of UEs, a feedback report for the first subset of network coded packets that indicates unsuccessful receipt of at least a first packet at the second UE, and transmit, responsive to the feedback report, a second communication to the second UE that includes information associated with the first packet. In some cases, the first sidelink communication includes at least one of a sidelink broadcast communication, a sidelink multicast communication, or a sidelink groupcast communication.

Some examples of the method, apparatuses, and non-transitory computer-readable medium described herein may further include operations, features, means, or instructions for receiving channel information associated with the second UE with the feedback report, and modifying a modulation and encoding scheme for the second communication with the second UE based on the channel information. In some examples of the method, apparatuses, and non-transitory computer-readable medium described herein, the channel information may be determined based on one or more of a channel state information reference signal or a demodulation reference signal transmitted by the first UE.

In some examples of the method, apparatuses, and non-transitory computer-readable medium described herein, the receiving the feedback report may include operations, features, means, or instructions for receiving one or more of a PDCP status report, an RLC status report, a MAC HARQ feedback transmission, or any combinations thereof, and determining a negative acknowledgment for at least the first packet based on the feedback report and a network coding algorithm used to encode the first subset of network coded packets.

Some examples of the method, apparatuses, and non-transitory computer-readable medium described herein may further include operations, features, means, or instructions for receiving, from a base station, configuration information that indicates one or more of a network coding algorithm for the network coded packets, an encoding function or matrix for the network coded packets, a number of decoding iterations that are performed for the network coded packets, a timing synchronization for sidelink communications, or any combinations thereof. In some examples of the method, apparatuses, and non-transitory computer-readable medium described herein, the configuration information may be provided by the base station via one or more of RRC signaling, a MAC-CE, DCI, or any combinations thereof. In some examples of the method, apparatuses, and non-transitory computer-readable medium described herein, the node may be an RSU in a C-V2X sidelink communication system.

In some examples of the method, apparatuses, and non-transitory computer-readable medium described herein, the first packet may be a network coded packet, and where the second communication includes a retransmission of the network coded packet. Some examples of the method, apparatuses, and non-transitory computer-readable medium described herein may further include operations, features, means, or instructions for decoding one or more source packets based on a network coding algorithm and the first subset of network coded packets, determining that at least one source packet may be unacknowledged at the second UE based on the network coding algorithm being unable to recover the at least one source packet from acknowledged network coded packets of the first subset of network coded packets, and determining to retransmit one or more network coded packets based on the at least one source packet. Some examples of the method, apparatuses, and non-transitory computer-readable medium described herein may further include operations, features, means, or instructions for encoding one or more new network coded packets based on the network coding algorithm and the at least one source packet, and transmitting the one or more new network coded packets in the second communication.

Some examples of the method, apparatuses, and non-transitory computer-readable medium described herein may further include operations, features, means, or instructions for receiving, from the first UE, a second subset of network coded packets in a second sidelink communication, receiving, from the second UE, second feedback for the second communication and the second sidelink communication, and retransmitting one or more packets of the first sidelink communication or the second sidelink communication based on one or more feedback reports received from one or more of the set of UEs. In some cases, the second sidelink communication includes at least one of a sidelink broadcast communication, a sidelink multicast communication, or a sidelink groupcast communication. In some examples of the method, apparatuses, and non-transitory computer-readable medium described herein, the first packet may be a network coded packet, and where the second communication includes a retransmission of the network coded packet and one or more new network coded packets that include one or more source packets associated with the first packet based on a network coding algorithm to encode the one or more source packets.

DETAILED DESCRIPTION

Figure 1:
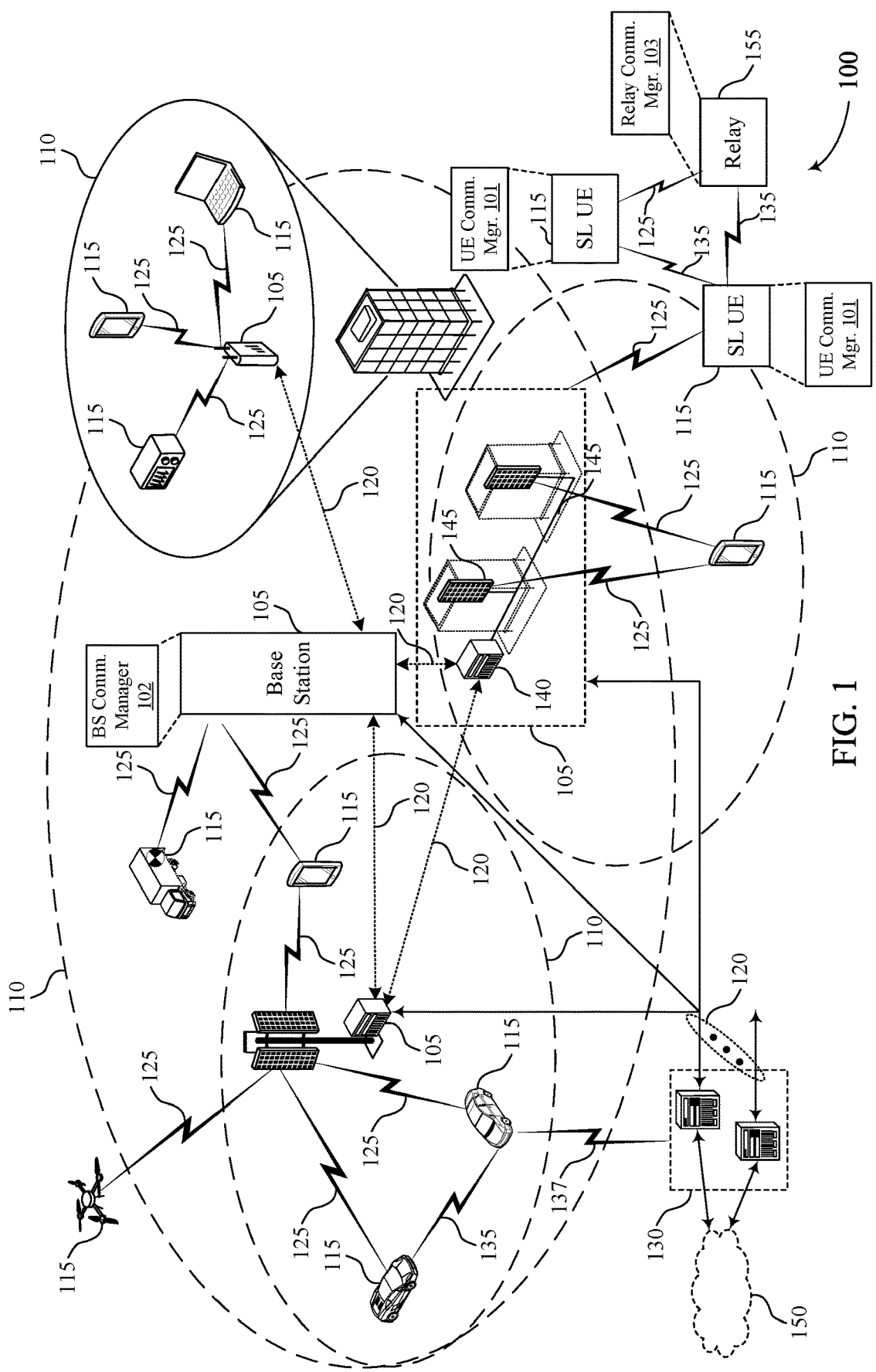
FIG. 1 illustrates an example of a system for wireless communications that supports relay design for sidelink communications using network coding in accordance with aspects of the present disclosure.

A wireless communication system may support both access links and sidelinks for communications between wireless devices. An access link may refer to a communication link between a user equipment (UE) and a base station (e.g., via a Uu interface in an NR system). For example, an access link may support uplink signaling, downlink signaling, connection procedures, etc. A sidelink may refer to a communication link between similar wireless devices (e.g., a communication link between UEs via a PC5 interface, or a backhaul communication link between base stations such as an integrated access and backhaul (IAB) communication link). It is noted that while various examples provided herein are discussed for UE sidelink devices, such sidelink techniques may be used for any type of wireless communications devices (e.g., UEs, base stations, etc.) that use sidelink communications. For example, a sidelink may support device-to-device (D2D) communication, vehicle-to-everything (V2X) and/or vehicle-to-vehicle (V2V) communication, proximity-based services (ProSe) communication, PC5 communication, IAB communication, message relaying, discovery signaling, beacon signaling, or any combination of these or other signals transmitted over-the-air from between devices.

Various sidelink connections between sidelink devices thus may be used to support data flows between the devices. As demand for sidelink communication increases, (e.g., due to increased V2X demand for autonomous and semi-autonomous vehicles, D2D communication between Internet-of-Things (IoT) devices, etc.), techniques to efficiently and reliably enhance throughput of sidelink channels is desirable. Techniques such as those discussed in various aspects of the present disclosure provide for enhancements to sidelink communications. In some cases, a first sidelink device (e.g., a first UE) may transmit a broadcast, multicast, or groupcast sidelink communication to multiple other sidelink devices. For example, in a V2X system, a first UE of a first vehicle may transmit sidelink communications to multiple other UEs of other vehicles (e.g., information related to vehicle status, speed, direction, acceleration, etc.). In some cases, one or more other sidelink devices may not successfully receive the broadcast, multicast, or groupcast communications due to, for example, interference present on the wireless channel used for sidelink broadcast, multicast, or groupcast communication. In some cases, one or more techniques may be used to help enhance the likelihood of successful communications such as, for example, network coding of communications (e.g., to allow a receiving device to recover one or more lost packets), feedback and retransmission techniques (e.g., hybrid automatic repeat request (HARQ) feedback and retransmissions), radio link control (RLC) status messages, packet data convergence protocol (PDCP) status messages, or any combinations thereof. However, in some cases such sidelink communications may provide information that is critical for other devices (e.g., for safety reasons), and high reliability is desirable.

In accordance with various aspects of the present disclosure, a node (e.g., a relay node or a relay device) may perform retransmissions for sidelink communications, which may enhance reliability and latency in sidelink communications. In some cases, a first UE may transmit a broadcast, multicast, or groupcast sidelink communication for reception at multiple other UEs, which may include a second UE. In some cases, the second UE may determine that one or more packets of the broadcast, multicast, or groupcast sidelink communication is not successfully received, and may transmit feedback (e.g., HARQ ACK/NACK feedback) that indicates one or more packets that are not successfully received. In some cases, a node may receive the broadcast, multicast, or groupcast sidelink communication, and the second UE may transmit the feedback to the node which may then retransmit one or more unsuccessfully received packets. Such a node, which may be an example of a relay node, relay device, an IAB node, or the like, may in some cases also provide relay functionality in a communications system by transmitting received packets from another node (e.g., a serving base station) to one or more other devices (e.g., one or more UEs that may be outside of a coverage area of the serving base station, another relay node in a multi-hop relay, and the like). In some cases, the node may be a roadside unit (RSU), and in a cellular vehicle-to-everything (C-V2X) system multiple RSUs may be placed at intervals along a roadway so as to provide continuous or near-continuous coverage to vehicles on the roadway. In various aspects as discussed herein, such RSUs may be used as a relay for V2X broadcast, multicast, or groupcast communications between UEs, and may provide retransmissions of broadcast, multicast, or groupcast packets that were not successfully received at one or more UEs.

In some cases, the RSU may monitor sidelink communications and store received broadcast, multicast, or groupcast sidelink communications. The RSU may also monitor for feedback from receiving UEs, and in the event the feedback indicates NACK for certain packets, the RSU may retransmit the NACK'ed packet(s) in a sidelink broadcast, multicast, or groupcast communication. The communication from the RSU may enhance likelihood of successful receipt at the receiving UE(s). In some cases, the broadcast, multicast, or groupcast communications may be encoded according to a network coding algorithm, and the RSU may retransmit one or more unacknowledged network coded packets, may encode and transmit new network coded packets (e.g., based on the source packets that were not received and the network coding algorithm), or both. In some cases, the new network coded packets may include fewer than all of the source packets initially transmitted. A base station may configure various parameters associated with the network coding, whether the RSU is to retransmit missed packets only or retransmit new encoded packets, and synchronization timing for the sidelink communications.

Various aspects of the disclosure thus provide for a node (e.g., a relay node or a relay device) that may monitor for sidelink communications and associated feedback, and retransmit one or more packets that are not successfully received and decoded at a UE. Such techniques may provide a number of benefits or advantages, such as efficient retransmission of one or more packets, which may enhance reliability of communications. Advantages and benefits of such techniques further include reliable and secure communication of critical information and reduced latency, among other advantages.

Aspects of the disclosure are initially described in the context of wireless communications systems. Various examples of nodes (e.g., relay nodes or relay devices) and retransmission techniques are then described. Aspects of the disclosure are further illustrated by and described with reference to apparatus diagrams, system diagrams, and flowcharts that relate to relay design for sidelink communications using network coding.

FIG. 1 illustrates an example of a wireless communications system 100 that supports relay design for sidelink communications using network coding in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol), which may also be referred to as a sidelink 135. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the sidelink 135 may be an example of a communication channel between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, relays 155, RSUs (which may be an example of a relay 155 in some cases), or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5GC, which may include at least one control plane entity that manages access and mobility (e.g., a mobility management entity (MME), an AMF) and at least one user plane entity that routes packets or interconnects to external networks (e.g., a serving gateway (S-GW), a Packet Data Network (PDN) gateway (P-GW), or a UPF). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In various examples, one or more UEs 115 may transmit a broadcast, multicast, or groupcast communication using a sidelink 135. In some cases, a relay 155 may monitor for such sidelink communications, and may act to receive feedback and provide retransmission for the sidelink communications. In various examples, a communications manager may be included in various devices to support techniques for relay sidelink communications. For example, a UE 115 may include a UE communications manager 101, a base station may include a base station communications manager 102, and a relay 155 may include a relay communications manager 103.

For example, a UE 115 (e.g., a first UE 115) may include the UE communications manager 101, which can be used to configure broadcast, multicast, or groupcast communications via a sidelink 135 to one or more other UEs 115. In some cases, the UE communications manager 101 may use network coding to encode sidelink communications in order to enhance the likelihood of successful decoding of the transmitted information in the event that one or more transmitted packets are unreceived at one or more UEs 115. In some cases, sidelink communications may be transmitted based on a configured periodicity (e.g., in sidelink communication resources configured in periodic time periods T). At a UE 115 that receives sidelink communications, UE communications manager 101 may attempt to receive and decode the sidelink communications, and transmit feedback that indicates one or more packets that are not successfully received. In some cases, the feedback may be transmitted to relay 155 in an uplink communication via a communication link 125 with the relay 155.

In some cases, relay communications manager 103 at relay 155 may monitor for sidelink broadcast, multicast, or groupcast communications on sidelinks 135, and may store detected sidelink communications. In some cases, the relay communications manager 103 may receive feedback from one or more other UEs 115 that are to receive sidelink communication, and may retransmit one or more packets based on the feedback. In some cases, such retransmissions may be transmitted via downlink communications to UEs 115 via one or more communication links 125. In some cases, the relay communications manager 103 may retransmit network coded packets based on the feedback. In other cases, the relay communications manager 103 may transmit new network coded packets based on the feedback. In such cases, the new network coded packets may be determined based on one or more source packets that are not received at one or more UEs 115 after performing decoding based on the network coding used for the sidelink communication, and encoding the identified missing source packets based on the network coding to generate the new network coded packets.

Additionally, the base station 105 may use the base station communications manager 102 to configure time periods (T) for sidelink broadcast, multicast, or groupcast communications, and to configure network coding that is to be used for such communications. The base station communications manager 102 may provide the configuration information to UEs 115 and relay 155 using, for example, RRC signaling.

Figure 2:
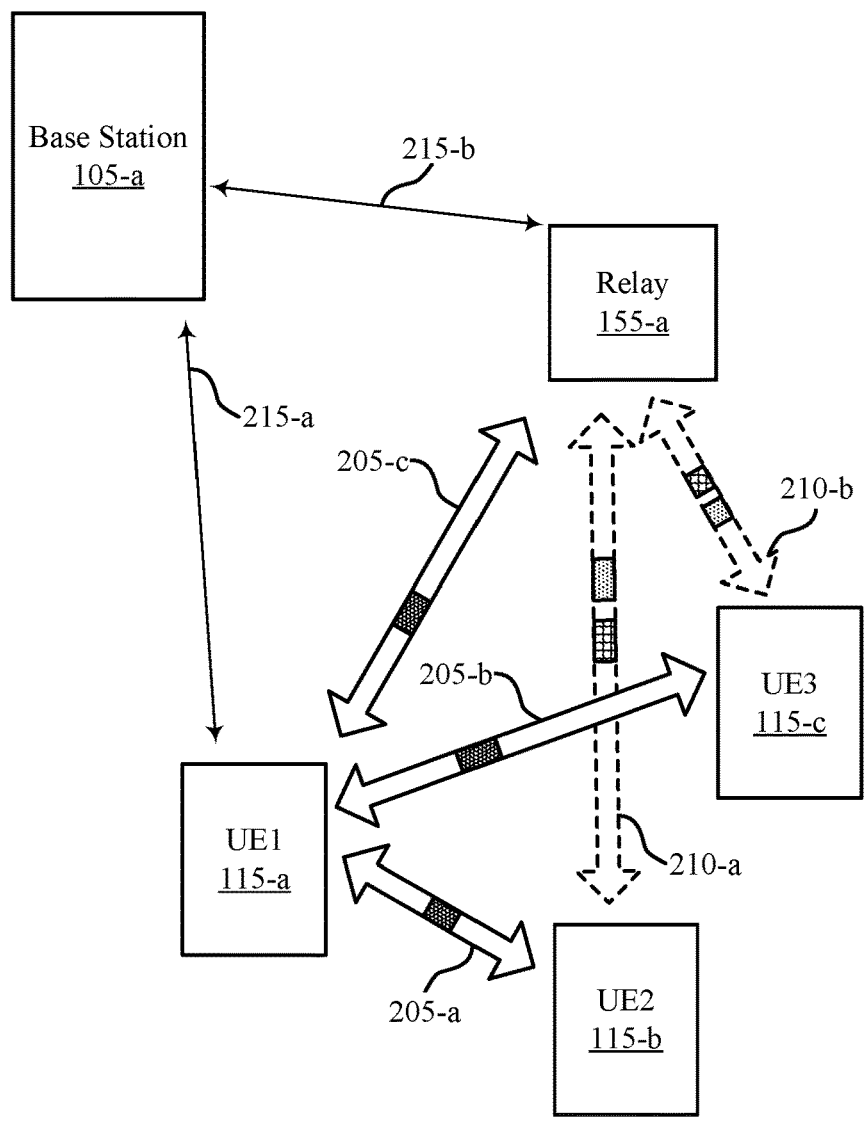
FIG. 2 illustrates an example of a wireless communications system that supports relay design for sidelink communications using network coding in accordance with aspects of the present disclosure.
Figure 2:
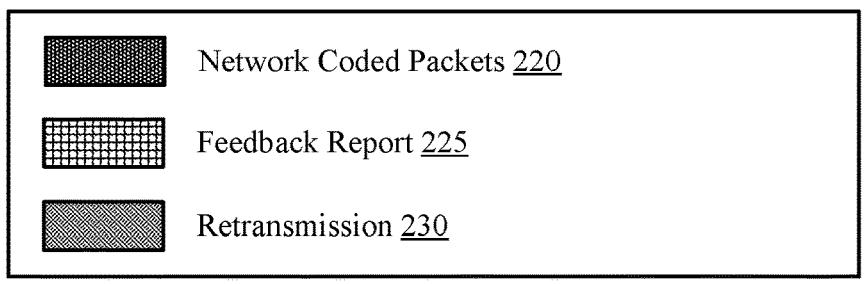

FIG. 2 illustrates an example of a portion of a wireless communications system 200 that supports relay design for sidelink communications using network coding in accordance with aspects of the present disclosure. In some examples, wireless communications system 200 may implement aspects of wireless communication system 100. For example, wireless communications system 200 may include a base station 105-a, a number of sidelink UEs 115, and a relay 155-a, which may be examples of corresponding base stations 105, UEs 115, and relays 155, respectively, as described with reference to FIG. 1.

In this example, the base station 105-a may configure UEs 115 and relay 155-a with one or more configurations related to sidelink communications, such as via configuration signaling 215 (e.g., RRC signaling), which may include first configuration signaling 215-a to first UE 115-a and second configuration signaling 215-b to relay 155-a. Further, in some cases, the base station 105-a may configure such sidelink communications to use network coding, in which a number of source packets (e.g., source packets p1, p2, . . . pn) may be encoded into a number of network coded packets (e.g., network coded packets q1, q2, . . . qN) according to a network coding algorithm. In some cases, the network coding algorithm may allow for the recovery of one or more source packets in cases where one or more network coded packets are missing. An example of a network coding technique is discussed in more detail with reference to FIG. 5.

In some cases, the configuration information from the base station 105-a may provide network coding parameters such as network coding algorithms, an encoding function or matrix, a maximum number of decoding iterations, and the like, which may be synchronized on each of the transmitting UE 115, the receiving UEs 115, and relay 155-a. As discussed, in some cases broadcast, multicast, or groupcast communications may be synchronized in a TDD system, and occur once every time period T. In some cases, the base station 105-a may configure network coding parameters and the transmission interval (e.g., value of T) by RRC configuration, MAC-CE, downlink control information (DCI), or any combinations thereof. In various aspects, the relay 155-a and UEs 115 may use the same network coding parameters.

In some cases, the first UE 115-a may broadcast, multicast, or groupcast network coded packets 220 once every period T. In some cases, one or more other UEs 115 may also broadcast network coded packets according to the period. The network coded packets 220 may be transmitted using sidelink connections 205 (e.g., first sidelink connection 205-a to second UE 115-b, second sidelink connection 205-b to a third UE 115-c, and third sidelink connection 205-c to relay 155-a). In this example, sidelink connections 205 are shown as solid lines. In the example of FIG. 2, a second UE 115-b and a third UE 115-c may receive the network coded packets 220 and perform decoding based on the network coding algorithm used to encode the network coded packets 220. The second UE 115-b and the third UE 115-c may generate a feedback report 225 that is transmitted to the relay 155-a. While second UE 115-b and third UE 115-c are illustrated in this example, any number of other UEs 115 may receive network coded packets 220 and transmit feedback reports 225. The feedback reports 225 may, in some cases, be transmitted using uplink communications in a direct link 210 (or access link) with the relay 155-a (e.g., in a first direct link 210-a between the second UE 115-b and the relay 155-a, and a second direct link 210-b between the third UE 115-c and the relay 155-a). In this example, direct link 210 connections (e.g., access link connections via a Uu interface as opposed to sidelink connections 205 via a PC5 interface) are shown as dashed lines.

Figure 3:
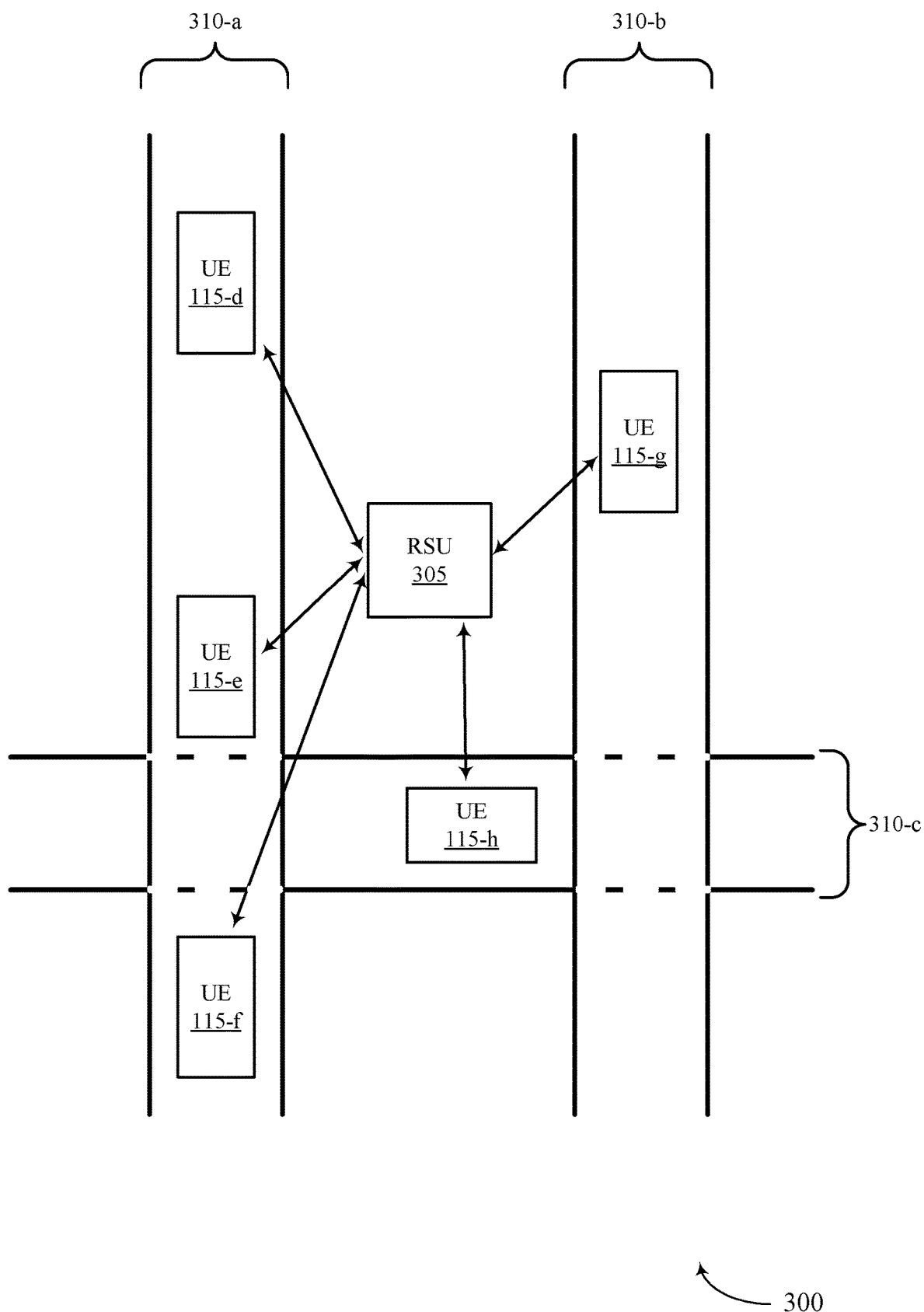
FIG. 3 illustrates an example of a wireless communications system that supports relay design for sidelink communications using network coding in accordance with aspects of the present disclosure.

In this example, the relay 155-a may monitor for the network coded packets 220, and store received packets. Based on the received feedback reports 225, the relay may provide retransmissions 230 to the second UE 115-b and third UE 115-c. In some cases, the retransmissions 230 may be transmitted as broadcast, multicast, or groupcast downlink communications in direct links 210 with UEs 115. In some cases, the relay 155-a may retransmit one or more of the network coded packets 220. In other cases, the relay 155-a may transit one or more new coded packets based on determining which source packets are not received at the second UE 115-b and third UE 115-c. In some cases, the feedback reports 225 may be generated in accordance with established feedback techniques, and may include, for example, a PDCP status report, an RLC status report, or MAC HARQ ACK information. In some cases, a channel state information (CSI) report may be sent together with feedback reports 225 in order to facilitate modulation and coding scheme (MCS) selection and rate control for retransmissions or subsequent communications. In some cases, CSI report information may only be sent with NACK feedback in order to request an updated MCS for better data reception, which may help to conserve overhead resources. In some cases, a relay 155-a may be implemented in an RSU such that reliability of broadcast, multicast, or groupcast communications in a C-V2X system may be enhanced. FIG. 3 provides one example of such a deployment.

FIG. 3 illustrates an example of a wireless communications system 300 that supports relay design for sidelink communications using network coding in accordance with aspects of the present disclosure. In some examples, wireless communications system 300 may implement aspects of wireless communication system 100 or 200. In this example, an RSU 305 may act as a node or a relay (e.g., a relay 155 as discussed herein).

The RSU 305 may be one of a number of RSUs 305 that are located at intervals along roadway 310 (e.g., associated with northbound portion of roadway 310-a and southbound portion of roadway 310-b, and an intersecting roadway 310-c). In this example, UEs 115 may be associated with vehicles travelling along the roadways 310, and operate to use sidelink communications in a C-V2X deployment. The roadways 310 may be any of a number of different types of roadways, or combinations of different types of roadways (e.g., divided highways or streets, undivided highways or streets, tunnels, over/under passes, bridges, etc.). In some cases, a first UE 115-d may transmit broadcast sidelink communications (e.g., information related to UE 115-d direction, location, speed, acceleration, identified hazards or obstructions, expected changes in direction/speed/acceleration, etc.) to each of the RSU 305 and a number of other UEs 115-e through 115-h. In some cases, multiple of the UEs 115 may transmit broadcast sidelink communications in accordance with a periodic sidelink communications configuration. The RSU 305 may monitor the broadcast sidelink communications, and also monitor for feedback associated with the sidelink communications. The RSU 305 may perform one or more retransmissions based on feedback received that indicates one or more sidelink communications packets are not successfully received at one or more UEs 115. In some cases, RSU 305 may coordinate with one or more other neighboring RSUs via backhaul links (e.g., fiber links or wireless IAB links) to coordinate retransmissions (e.g., by providing retransmissions from multiple RSUs 305 in a single frequency network (SFN) configuration).

Figure 4:
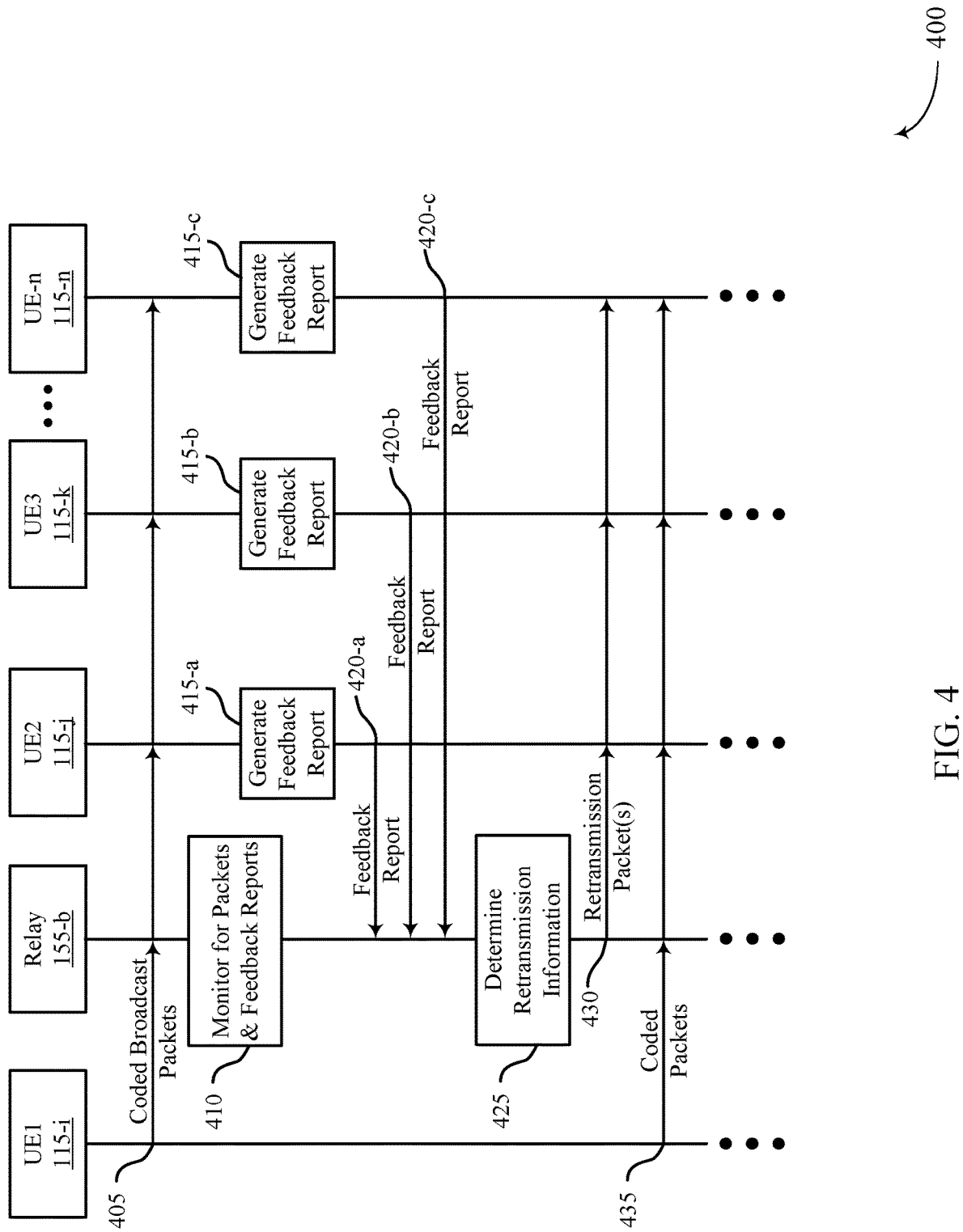
FIG. 4 illustrates an example of a process flow that supports relay design for sidelink communications using network coding in accordance with aspects of the present disclosure.

FIG. 4 illustrates an example of a process flow 400 that supports relay design for sidelink communications using network coding in accordance with aspects of the present disclosure. In some examples, process flow 400 may implement aspects of wireless communications system 100, 200, or 300. Process flow 400 may be implemented by first UE 115-$i$, second UE 115-$j$, third UE 115-$k$, $n^{th}$ UE 115-$n$, and relay 155-$b$, or any other examples of UEs 115 or relays 155 as described herein. Alternative examples of the following may be implemented, where some steps are performed in a different order than described or are not performed at all. In some cases, steps may include additional features not mentioned below, or further steps may be added.

At 405, the first UE 115-$i$ may transmit coded broadcast, multicast, or groupcast packets in a sidelink broadcast, multicast, or groupcast communication. In some cases, the coded broadcast, multicast, or groupcast packets may be transmitted using configured periodic resources for sidelink broadcast communications. For example, the coded broadcast, multicast, or groupcast packets may be transmitted at time T in accordance with a configured periodicity for such broadcast, multicast, or groupcast communications (e.g., to transmit vehicle status information in a C-V2X deployment). The second UE 115-$j$ through nth UE 115-$n$ may monitor for sidelink broadcast, multicast, or groupcast communications, in accordance with the configured resources for such communications. The first UE 115-$i$ may transmit the coded packets based on a configured network coding algorithm, as discussed herein. For example, the first UE 115-$i$ may transmit network coding encoded packets q=q1, q2, q3 on a sidelink.

At 410, the relay 155-$b$ may monitor for broadcast, multicast, or groupcast packets and feedback reports. In some cases, the relay 155-$b$ may be aware of the configured periodic resources (e.g., based on configuration information provided by a base station) and may monitor periodic resources at time T based on the configuration. In some cases, the relay 155-$b$ may monitor for broadcast, multicast, or groupcast communications of multiple UEs, and store received broadcast, multicast, or groupcast packets for use in one or more potential retransmissions. For example, the relay 155-$b$ may receive the encoded packets q=q1, q2, q3 on a sidelink and store the received packets (e.g., in a buffer C, such that C=q1, q2, q3).

At 415, each of the receiving UEs 115-$j$ through 115-$n$ may determine feedback associated with the coded broadcast, multicast, or groupcast packets, and may generate a feedback report. At 420, each of these UEs 115 may transmit a feedback report to the relay 155-$b$. The feedback may be determined based on whether the associated UE 115 is able to successfully decode the transmitted coded broadcast, multicast, or groupcast packets. In some cases, the feedback may include an indication of whether one or more of the network coded broadcast, multicast, or groupcast packets are received or not (e.g., HARQ ACK/NACK feedback). In other cases, the feedback may include an indication of whether one or more source packets are received based on decoding according to the network coding algorithm used to encode the transmitted source packets. In such cases, the feedback may be an RLC status report, a PDCP status report, a MAC HARQ ACK/NACK indication, or combinations thereof. In some cases, the feedback reports may be transmitted to the relay 155-$b$ using a direct link or access link (e.g., in uplink control information in an uplink communication)

At 425, the relay 155-$b$ may determine retransmission indication based on the received feedback reports. In some cases, the relay 155-$b$ may determine one or more network coded broadcast, multicast, or groupcast packets that are to be retransmitted. For example, the relay 155-$b$ may determine, for each UE 115, any missed packets, such as Mx=missed packets for UE-x, which corresponds to Mx=C-total received packets of UE-x). In some cases, the relay 155-$b$ may determine the packets to be retransmitted as relay packets M=union of all Mi, such that all missed packets are retransmitted. In other cases, the relay 155-$b$ may determine the top k missed packets (e.g., M=top k missed packets).

For example, if the feedback reports indicate that the second UE 115-$j$ received q1 and q2; the third UE 115-$k$ received q1 and q3, and the $n^{th}$ UE 115-$n$ received q1 and q2, then Mj=q3, Mk=q2, and Mn=q3. The union of all Mi in such an example thus provides that M=q2,q3. In examples where the top k missed packets are transmitted (e.g., if k=1), then M=q3 due to two UEs 115 having missed q3. In some cases, the determination of the packets to retransmit may be configured by a base station.

At 430, the relay 155-$b$ may transmit retransmission packets (e.g., M) to the UEs 115. In some cases, the retransmission packets may be transmitted using downlink communications of a direct link or access link. In other cases, the retransmission packets may be transmitted on the sidelink in accordance with the configured broadcast, multicast, or groupcast resources. Thus, in this example, the relay 155-$b$ retransmits instances of the network coded packets that are missing at one or more UEs 115. At 435, the first UE 115-$i$ may transmit further sidelink coded broadcast, multicast, or groupcast packets at the time period of the next configured sidelink broadcast, multicast, or groupcast resources. For example, at time 2T the first UE 115-$i$ may transmit q=q4, q5,q6 on the sidelink, which may be monitored by the relay 155-$b$, and the process repeated for determining packets to be retransmitted (e.g., based on which of packets q1 through q6 are missing based on feedback reports). This process may then repeat for times 3T, 4T, and so on.

In other cases, the relay 155-$b$ may retransmit new encoded packets. In such cases, the relay 155-$b$ may decode the network coded packets to determine the source packets, determine retransmissions based on missing source packets, and encode new network coded packets based on the missing source packets. For example, if the first UE 115-$i$ transmits network coding encoded packet q=q1, q2, q3 on sidelink, the relay 155-$b$ may receive the packets and store them in C, and then decode C in accordance with the network coding algorithm to recover source packets, which may be D=p1,p2, in this example. Then, based on the received feedback reports the relay 155-$b$ may determine Mx in a similar manner as discussed above. The relay 155-$b$ may then determine the decoded packets Dx at UEx by decoding Mx in accordance with the configured network coding algorithm. The relay 155-$b$ may then determine which source packets are not received based on an intersection of all Dx and D. The relay 155-$b$ may then encode the determined missing source packets for transmission (e.g., M=f(D−intersection(Dx)), where f(.) is the network encoding function). The new encoded packets may then be transmitted at 430, which may be transmitted at the same time as the coded broadcast, multicast, or groupcast packets at 435. This process may then repeat for times 2T, 3T, 4T, and so on.

In further cases, the relay 155-$b$ may retransmit both missed encoded packets and newly encoded packets. In such cases, the relay 155-$b$ may determine Mx=received packets, and Sx=missed packets for UE x, and determine the decoded packets Dx at each UE x by decoding Mx. The relay 155-$b$ may then determine new encoded packets m1=f(D−intersection(Dx)). The relay 155-$b$ may also determine missed packets m2, which may be the union or intersection of Sx, or top k missed packets among Sx. The relay 155-$b$ may then determine the retransmission packets for transmission at 430 based on M=m1+m2. This process may then repeat for times 2T, 3T, 4T, and so on.

Figure 5:
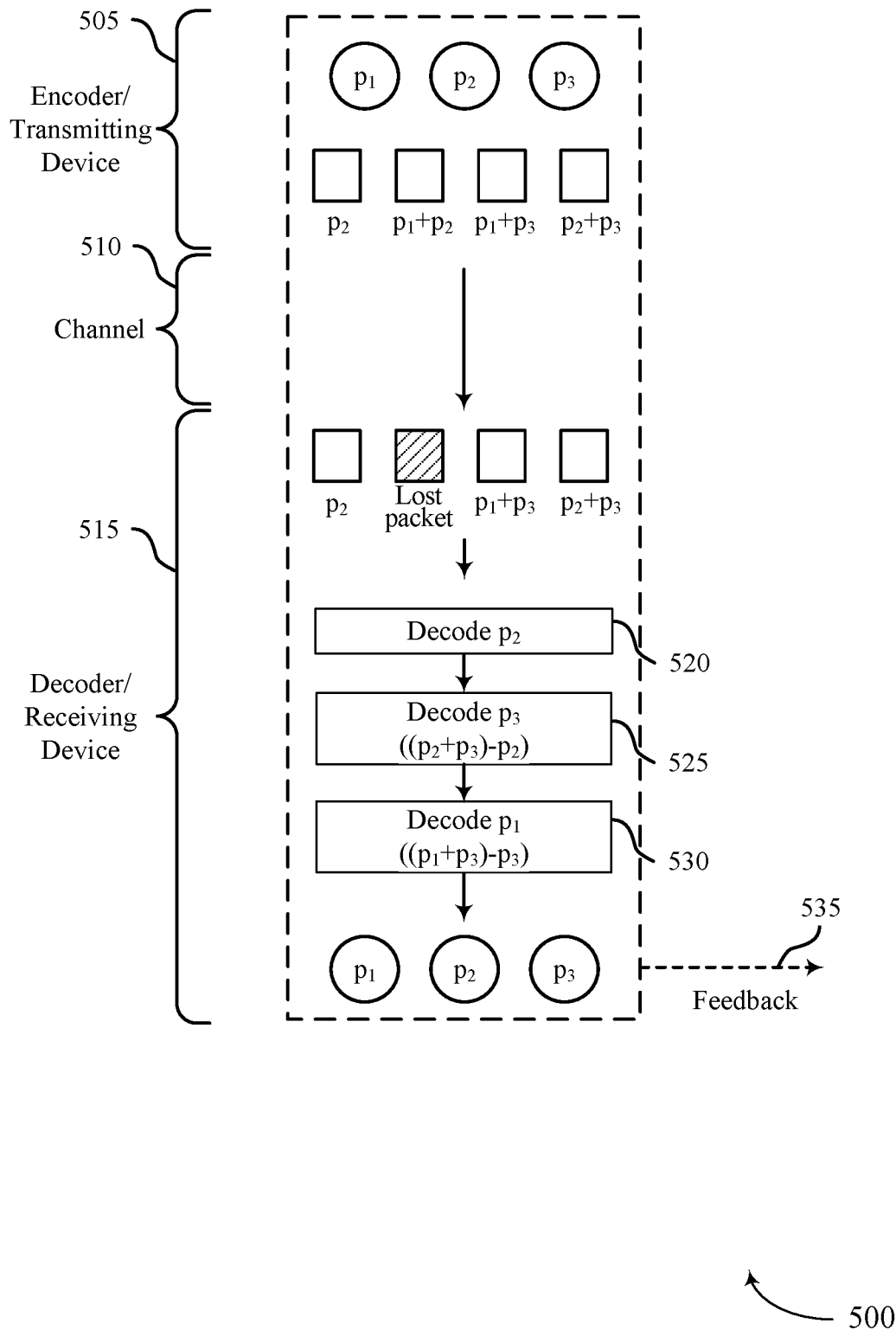
FIG. 5 illustrates an example of a network coding technique that supports relay design for sidelink communications using network coding in accordance with aspects of the present disclosure.

FIG. 5 illustrates an example of a network coding technique 500 that supports relay retransmissions using network coding in accordance with aspects of the present disclosure. In some examples, network coding technique 500 may implement aspects of wireless communications system 100, 200, or 300. In this example, an encoder or transmitting device 505 (e.g., a transmitting sidelink UE) may transmit one or more transmissions via channel 510 to a decoder or receiving device 515 (e.g., a receiving UE, relay, or both). The decoder or receiving device 515 may provide feedback 535 back to a relay device (e.g., a relay 155 or RSU 305) in accordance with aspects as discussed herein. Additionally, in some cases the feedback 535 may be provided to the encoder or transmitting device 505. In any event, the feedback 535 may be used to update a distribution function for network coding of packets or sub-packets that are to be transmitted. The encoder or transmitting device 505 may be a wireless device as discussed herein, such as a base station, a UE, an IAB device, C-V2X device, and the like. Likewise, the decoder or receiving device 515 may be a wireless device as discussed herein, such as a base station, a UE, an IAB device, C-V2X device, and the like.

In this example, the encoder or transmitting device 505 may encode data, shown as a set of original source packets, $p_1$, $p_2$, and $p_3$ (e.g., sub-packets of an RLC packet), into a set of encoded packets using network coding. An encoded sub-packet may be the same as an original packet, may be a redundancy version of an original packet, may include a combination of multiple original packets (e.g., a subset of the original packets), may include a redundancy version of the combination, or combinations thereof. The number of encoded packets (q) may be the same as or different than the number of original packets (p). In example 500, the encoder encodes K original packets (where K=3) into N encoded packets (where N=4, corresponding to q1 through q4). The encoder transmits the encoded packets to the decoder or receiving device 515 via channel 510 (e.g., one or multiple carriers or beams). The decoder uses network coding to decode the encoded packets and recover the original packets (e.g., original source packets p1 through p3). As used herein, network coding may be performed using any type of network coding scheme, such as fountain coding, XOR coding, linear network coding, random linear network coding, Luby transform (LT) network coding, Raptor network coding, and the like.

In the example of FIG. 5, the encoder encodes three original packets ($p_1$, $p_2$, and $p_3$) into four encoded packets (q1-q4 that carry, respectively, $p_2$, $p_1+p_2$, $p_1+p_3$, and $p_2+p_3$) and transmits the four encoded packets to the decoder. In this example, the packet carrying $p_1+p_2$ is not successfully received by the decoder. In a first operation 520, the decoder decodes the packet carrying $p_2$. In a second operation 525, the decoder obtains $p_3$ from the packet containing $p_2+p_3$ because the decoder has already decoded $p_2$ and can use combining to obtain $p_3$ from $p_2+p_3$. In a third operation 530, the decoder obtain $p_1$ from the packet containing $p_1+p_3$ because the decoder has already decoded $p_3$ and can use combining to obtain $p_1$ from $p_1+p_3$. In some aspects, an encoded packet may include an indication (e.g., in a header of the encoded packet) that indicates the original packet(s) that are included in the encoded packet. Thus, the decoder can obtain $p_1$, $p_2$, and $p_3$ despite $p_1+p_2$ failing, and using less overhead than having to retransmit one of the original packets or other techniques such as PDCP duplication. For example, PDCP duplication may duplicate all of the original packets for a total of six transmissions, while the example network coding shown in FIG. 5 uses four transmissions.

In some cases, the encoder may continue to transmit encoded packets (e.g., the same combination of encoded packets or different combinations of encoded packets) to the decoder until the encoder receives a notification from the decoder. For example, the decoder may successfully receive the original packets or may abort decoding, which may trigger the decoder to send feedback 535 to the encoder. The notification may include, for example, an acknowledgement (ACK), a stop message (STOP), and the like. In some cases, the decoder may transmit an ACK for each original packet or each network coded packet that is successfully received. Upon receiving the feedback 535, the encoder may encode additional data (e.g., a new or updated set of original packets, which may include one or more original packets that have not yet been successfully received), and may transmit encoded packets to the decoder, in a similar manner as described herein, until all of the data has been transmitted and successfully received.

In some scenarios, using network coding may improve performance (e.g., by providing higher reliability, by providing lower latency, by using less network overhead, and the like) as compared to not using network coding. For example, when a payload size of one or more wireless communications (e.g., PDCP packets, RLC packets, and the like) is large or when a link loss probability of a channel between the transmitter and the receiver is large (e.g., due to poor channel conditions), then network coding may be enabled. However, when the payload size is small and the link loss probability is small, then network coding may be disabled. In some cases, improved performance (e.g., by providing higher reliability, by providing lower latency, by using less network overhead, and the like) may be achieved by dynamically switching between using network coding and not using network coding based at least in part on changing conditions, such as a changing payload size of information to be transmitted, changing channel conditions, and the like. Further, some techniques and apparatuses described herein enable configuration of network coding to improve performance.

Figure 6:
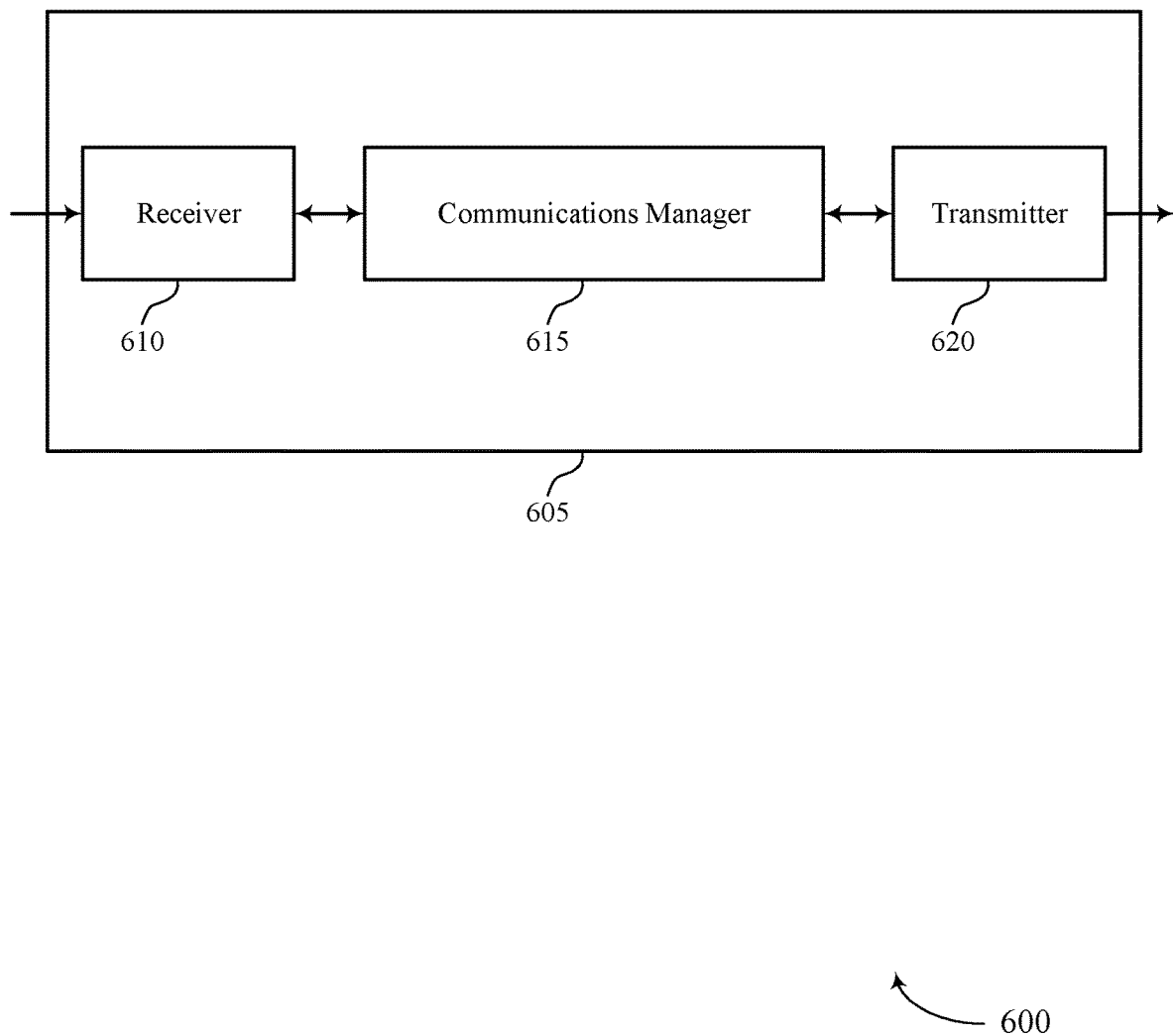
FIGS. 6 and 7 show block diagrams of devices that support relay design for sidelink communications using network coding in accordance with aspects of the present disclosure.

FIG. 6 shows a block diagram 600 of a device 605 that supports relay design for sidelink communication using network coding in accordance with aspects of the present disclosure. The device 605 may be an example of aspects of a UE 115 (e.g., a second UE) as described herein. The device 605 may include a receiver 610, a communications manager 615, and a transmitter 620. The device 605 may also include a processor. Each of these components may be in communication with one another (e.g., via one or more buses).

Receiver 610 may provide a means for receiving information such as packets, user data, or control information associated with various information channels (e.g., control channels, data channels, and information related to relay retransmissions for sidelink communications using network coding, etc.). Information may be passed on to other components of the device 605. The receiver 610 may be an example of aspects of the transceiver 920 as described with reference to FIG. 9. The receiver 610 may utilize a single antenna or a set of antennas.

Transmitter 620 may provide a means for transmitting signals generated by other components of the device 605. In some examples, the transmitter 620 may be collocated with a receiver 610 in a transceiver module. For example, the transmitter 620 may be an example of aspects of the transceiver 920 as described with reference to FIG. 9. The transmitter 620 may utilize a single antenna or a set of antennas.

The communications manager 615 may be an example of means for performing various aspects of relay retransmissions of sidelink communications as described herein. The communications manager 615, or its sub-components, may be implemented in hardware (e.g., in communications management circuitry), code (e.g., as communications management software or firmware) executed by a processor, or any combination thereof. If implemented in code executed by a processor, the functions of the communications manager 615, or its sub-components may be executed by a general-purpose processor, a digital signal processor (DSP), a central processing unit (CPU), an application-specific integrated circuit (ASIC), a field-programmable gate array (FPGA) or other programmable logic device, discrete gate or transistor logic, discrete hardware components, or any combination thereof designed to perform the functions described in the present disclosure. In some examples, the communications manager 615 may be configured to perform various operations (e.g., receiving, determining, transmitting) using or otherwise in cooperation with the receiver 610, the transmitter 620, or both.

The communications manager 615 may support wireless communication in accordance with examples as disclosed herein. For example, the communications manager 615 may be configured to provide or support a means for receiving, from a first UE, a first subset of network coded packets in a first sidelink communication. The communications manager 615 may also be configured to provide or support a means for determining feedback for the first subset of network coded packets that indicates unsuccessful receipt of at least a first packet at the second UE. The communications manager 615 may also be configured to provide or support a means for transmitting, to a relay node, a feedback report that indicates a negative acknowledgment for the first packet. The communications manager 615 may also be configured to provide or support a means for receiving a transmission from the node that provides information associated with the first packet. The communications manager 615 may be an example of aspects of the communications manager 910 as described herein.

The actions performed by the communications manager 915 as described herein may be implemented to realize one or more potential advantages. One implementation may provide enhanced reliability for a UE 115 to receive and successfully decode sidelink broadcast, multicast, or groupcast communications. Another implementation may provide improved quality and reliability of service at the UE 115, as latency and the number of separate resources allocated to the UE 115 may be reduced.

Figure 7:
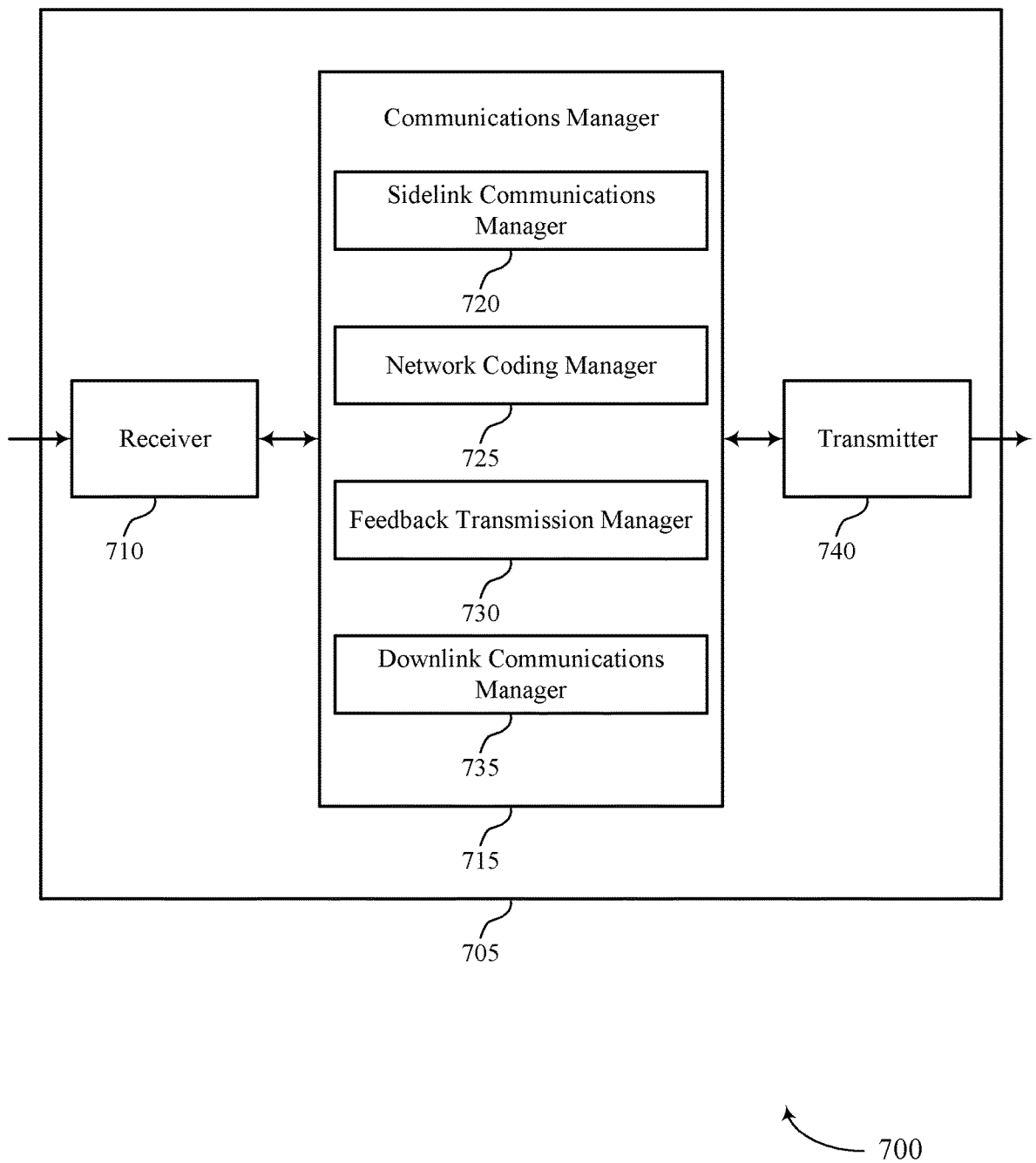

FIG. 7 shows a block diagram 700 of a device 705 that supports relay design for sidelink communications using network coding in accordance with aspects of the present disclosure. The device 705 may be an example of aspects of a device 605, a UE 115 as described herein. The device 705 may include a receiver 710, a communications manager 715, and a transmitter 740. The device 705 may also include a processor. Each of these components may be in communication with one another (e.g., via one or more buses).

Receiver 710 may provide a means for receiving information such as packets, user data, or control information associated with various information channels (e.g., control channels, data channels, and information related to relay retransmissions for sidelink broadcasts using network coding, etc.). Information may be passed on to other components of the device 705. The receiver 710 may be an example of aspects of the transceiver 920 as described with reference to FIG. 9. The receiver 710 may utilize a single antenna or a set of antennas.

The communications manager 715 or components thereof, may be an example of means for performing various aspects of sidelink communication with a node (e.g., a relay node or a relay device) that provides retransmissions as described herein. For example, the communications manager 715 may include a sidelink communications manager 720, a network coding manager 725, a feedback transmission manager 730, and a downlink communications manager 735. The communications manager 715 may be an example of aspects of the communications manager 615 or 910 as described herein.

The sidelink communications manager 720 may be configured to provide or support a means for receiving, from a first UE, a first subset of network coded packets in a first sidelink communication. The network coding manager 725 may be configured to provide or support a means for determining feedback for the first subset of network coded packets that indicates unsuccessful receipt of at least a first packet at the second UE. The feedback transmission manager 730 may be configured to provide or support a means for transmitting, to a node, a feedback report that indicates a negative acknowledgment for the first packet. The downlink communications manager 735 may be configured to provide or support a means for receiving a transmission from the node that provides information associated with the first packet.

Transmitter 740 may transmit signals generated by other components of the device 705. In some examples, the transmitter 740 may be collocated with a receiver 710 in a transceiver module. For example, the transmitter 740 may be an example of aspects of the transceiver 920 as described with reference to FIG. 9. The transmitter 740 may utilize a single antenna or a set of antennas.

Figure 8:
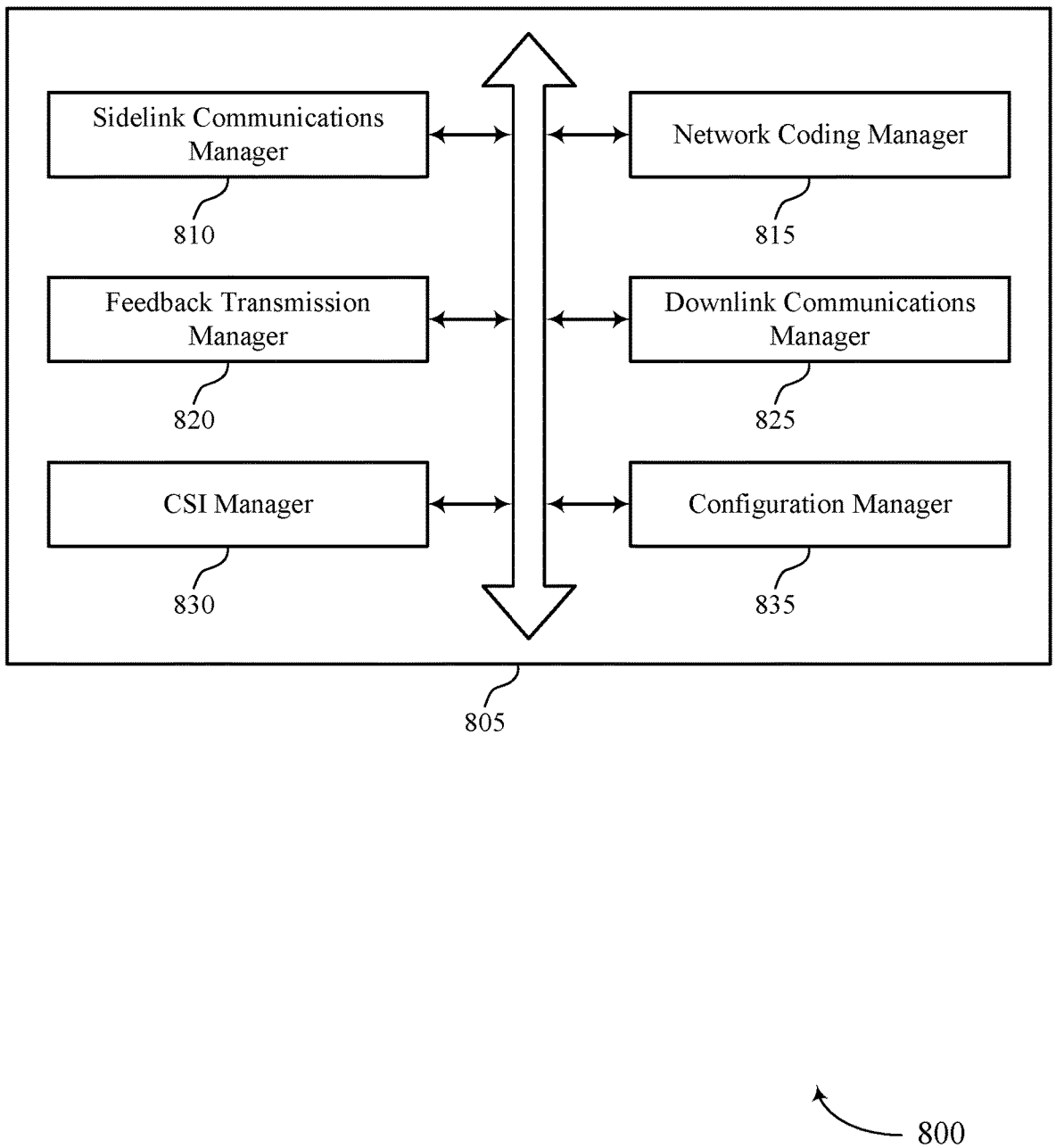
FIG. 8 shows a block diagram of a communications manager that supports relay design for sidelink communications using network coding in accordance with aspects of the present disclosure.

FIG. 8 shows a block diagram 800 of a communications manager 805 that supports relay design for sidelink communications using network coding in accordance with aspects of the present disclosure. The communications manager 805 may be an example of aspects of a communications manager 615, a communications manager 715, or a communications manager 910 described herein. The communications manager 805 or various components thereof, may be an example of means for performing various aspects of sidelink communication and retransmissions as described herein. For example, the communications manager 805 may include a sidelink communications manager 810, a network coding manager 815, a feedback transmission manager 820, a downlink communications manager 825, a CSI manager 830, and a configuration manager 835. Each of these modules may communicate, directly or indirectly, with one another (e.g., via one or more buses).

The sidelink communications manager 810 may be configured to provide or support a means for receiving, from a first UE, a first subset of network coded packets in a first sidelink communication. In some examples, the sidelink communications manager 810 may be configured to provide or support a means for receiving, from the first UE, a second subset of network coded packets in a second sidelink communication.

The network coding manager 815 may be configured to provide or support a means for determining feedback for the first subset of network coded packets that indicates unsuccessful receipt of at least a first packet at the second UE. In some examples, the network coding manager 815 may decode one or more source packets based on a network coding algorithm and the received first subset of network coded packets. In some examples, the network coding manager 815 may receive one or more new network coded packets. In some examples, the network coding manager 815 may decode the first packet based on a network coding algorithm used to encode the first subset of network coded packets and the one or more new network coded packets. In some examples, the network coding manager 815 may determine feedback for the transmission from the node and the second sidelink communication.

In some cases, the first packet is a network coded packet, and where the transmission from the node is a retransmission of the network coded packet. In some cases, the first packet is a network coded packet, and where the transmission from the node includes one or more new network coded packets that include one or more source packets associated with the first packet based on a network coding algorithm to encode the one or more source packets.

The feedback transmission manager 820 may be configured to provide or support a means for transmitting, to a node, a feedback report that indicates a negative acknowledgment for the first packet. In some examples, the feedback transmission manager 820 may transmit one or more of a PDCP status report, an RLC status report, a MAC HARQ feedback transmission, or any combinations thereof. In some examples, the feedback transmission manager 820 may transmit, to the node, a subsequent feedback report based on the feedback for the transmission from the node and the second sidelink communication. The downlink communications manager 825 may be configured to provide or support a means for receiving a transmission from the node that provides information associated with the first packet.

The CSI manager 830 may be configured to provide or support a means for transmitting channel information associated with the second UE with the feedback report to the node. In some cases, the channel information is determined based on one or more of a channel state information reference signal or a demodulation reference signal transmitted by the first UE.

The configuration manager 835 may be configured to provide or support a means for receiving, from a base station, configuration information indicates one or more of a network coding algorithm for the network coded packets, an encoding function or matrix for the network coded packets, a number of decoding iterations that may be performed for the network coded packets, a timing synchronization for sidelink communications, or any combinations thereof. In some cases, the configuration information is provided by the base station via one or more of RRC signaling, a MAC-CE, DCI, or any combinations thereof. In some cases, the node is a relay node of an RSU in a C-V2X sidelink communication system.

Figure 9:
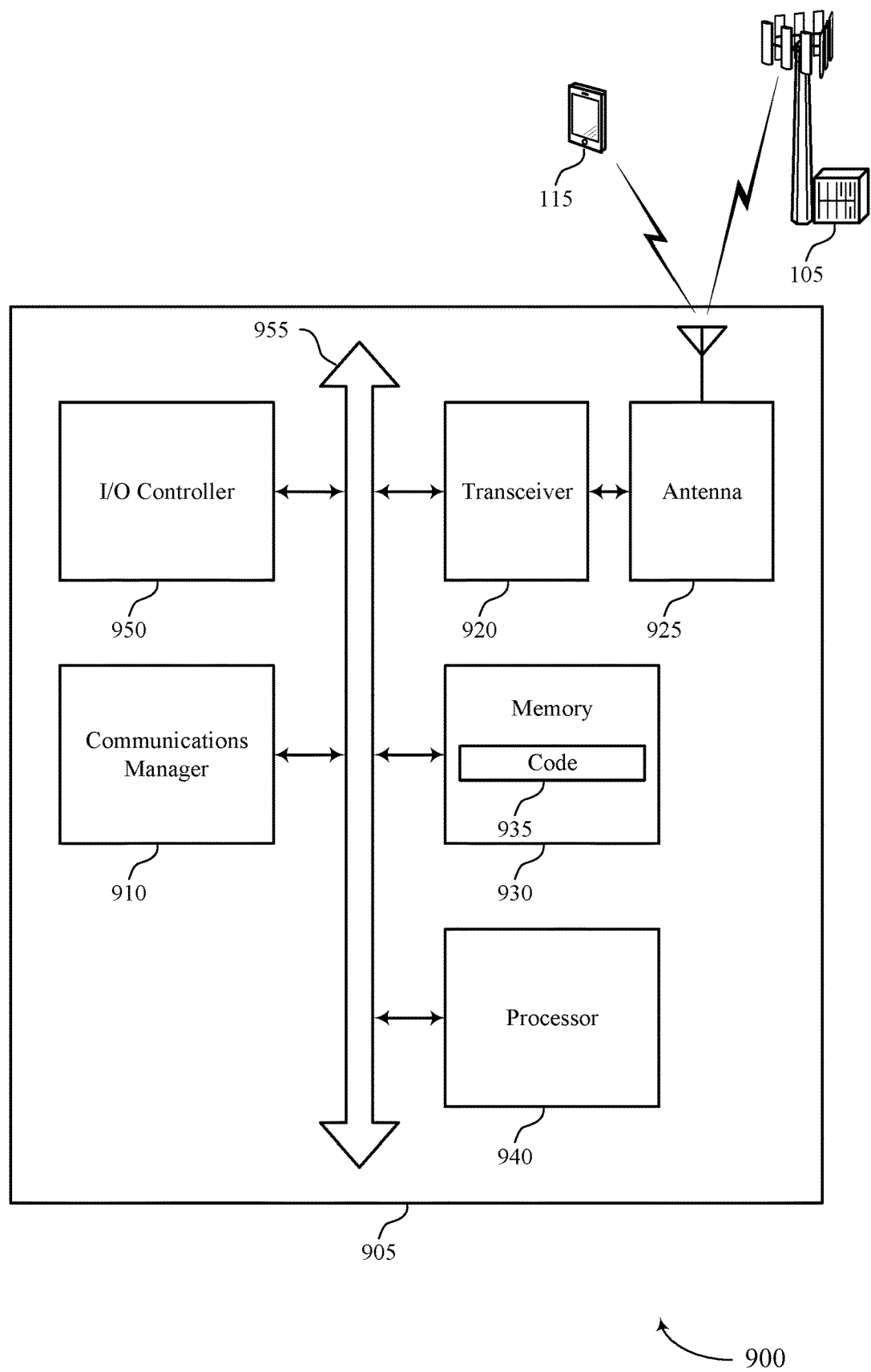
FIG. 9 shows a diagram of a system including a user equipment (UE) that supports relay design for sidelink communications using network coding in accordance with aspects of the present disclosure.

FIG. 9 shows a diagram of a system 900 including a device 905 that supports relay design for sidelink communications using network coding in accordance with aspects of the present disclosure. The device 905 may be an example of or include the components of device 605, device 705, or a UE 115 as described herein. The device 905 may communicate wirelessly with one or more base stations 105, UEs 115, relays 155, or any combination thereof. The device 905 may include components for bi-directional voice and data communications including components for transmitting and receiving communications, including a communications manager 910, a transceiver 920, an antenna 925, memory 930, a processor 940, and an I/O controller 950. These components may be in electronic communication via one or more buses (e.g., bus 955).

The communications manager 910, or various components thereof, may be an example of means for performing various aspects of sidelink communication, feedback, and retransmissions as described herein. For example, The communications manager 910 may receive, from a first UE, a first subset of network coded packets in a first sidelink communication, determine feedback for the first subset of network coded packets that indicates unsuccessful receipt of at least a first packet at the second UE, transmit, to a node, a feedback report that indicates a negative acknowledgment for the first packet, and receive a transmission from the node that provides information associated with the first packet.

The actions performed by the communications manager 910 as described herein may be implemented to realize one or more potential advantages. One implementation may provide enhanced reliability for a UE 115 to receive and successfully decode sidelink communications. Another implementation may provide improved quality and reliability of service at the UE 115, as latency and the number of separate resources allocated to the UE 115 may be reduced.

In some examples, the communications manager 910 may be configured to perform various operations (e.g., receiving, determining, transmitting) using or otherwise in cooperation with one or both of the transceiver 920 or the one or more antennas 925. Although the communications manager 910 is illustrated as a separate component, in some examples, one or more functions described with reference to the communications manager 910 may be supported by or performed by the processor 935, the memory 930, the code 935, or any combination thereof. For example, the code 935 may include instructions executable by the processor 935 to cause the device 905 to perform various aspects of sidelink communications, feedback, and retransmissions as described herein, or the processor 935 and the memory 930 may be otherwise configured to perform or support such operations.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting relay design for sidelink communications using network coding).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
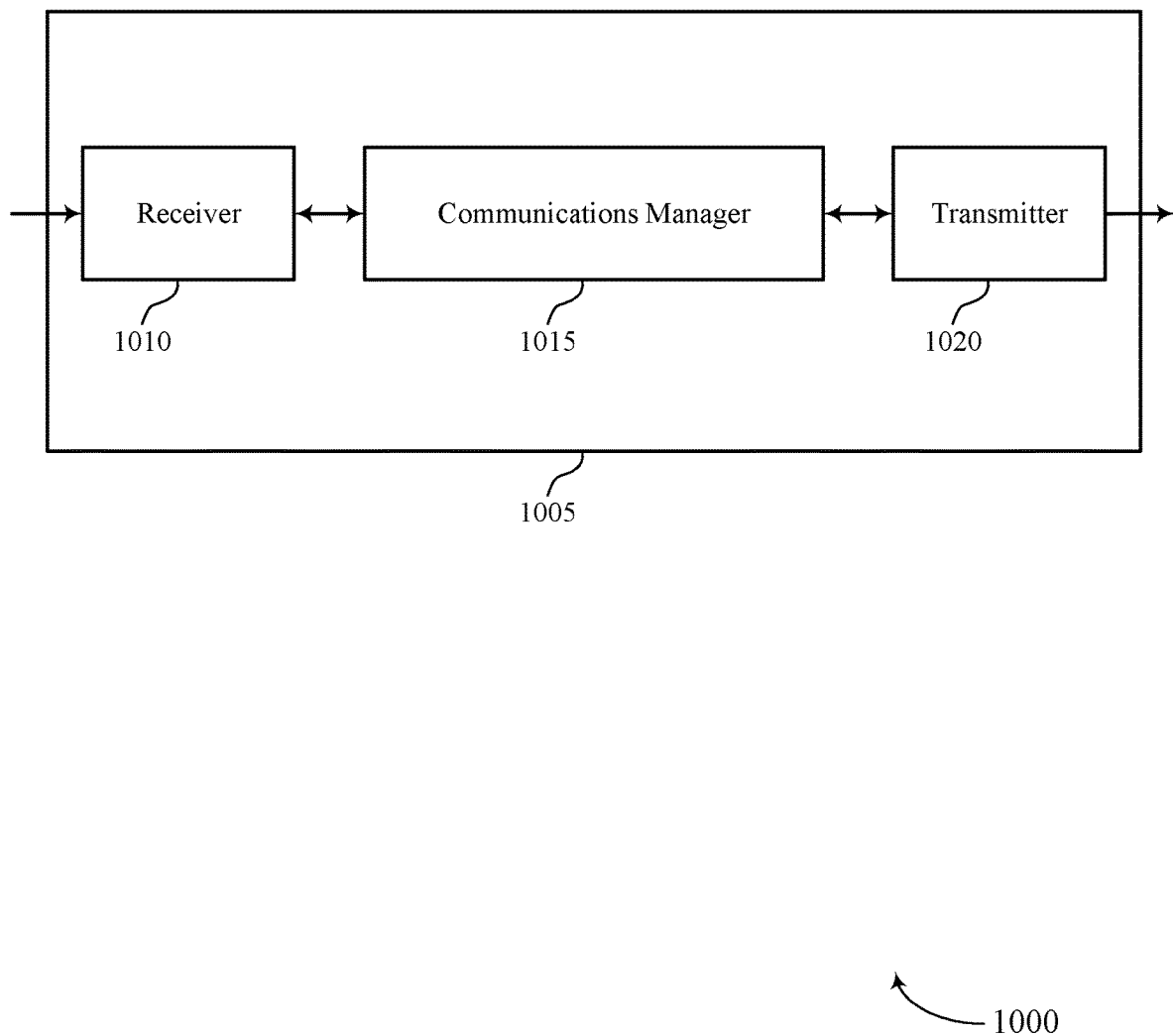
FIGS. 10 and 11 show block diagrams of devices that support relay design for sidelink communications using network coding in accordance with aspects of the present disclosure.

FIG. 10 shows a block diagram 1000 of a device 1005 that supports relay design for sidelink communications using network coding in accordance with aspects of the present disclosure. The device 1005 may be an example of aspects of a relay 155 or base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may provide a means for receiving information such as packets, user data, or control information associated with various information channels (e.g., control channels, data channels, and information related to relay retransmissions for sidelink communications using network coding, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 an example of means for performing various aspects of techniques as described herein. The communications manager 1015 may be configured to provide or support a means for receiving, from a first UE of a set of UEs configured for UE-to-UE sidelink communications, a first subset of network coded packets in a first sidelink communication that is transmitted from the first UE to other UEs of the set of UEs. The communications manager 1015 may also be configured to provide or support a means for receiving, from a second UE of the set of UEs, a feedback report for the first subset of network coded packets that indicates unsuccessful receipt of at least a first packet at the second UE. The communications manager 1015 may also be configured to provide or support a means for transmitting, responsive to the feedback report, a second communication to the second UE that includes information associated with the first packet to the second UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may provide a means for transmitting signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
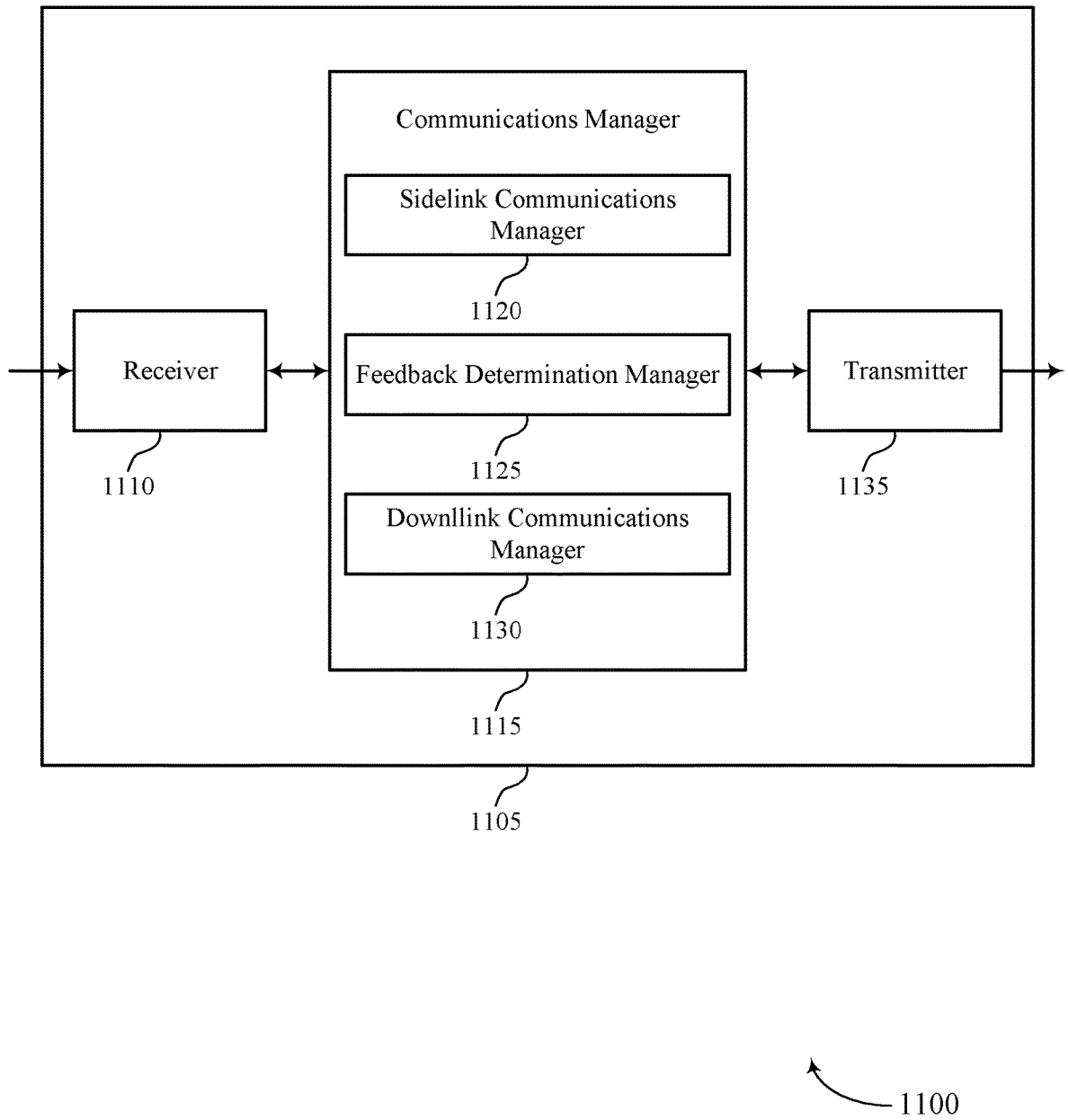

FIG. 11 shows a block diagram 1100 of a device 1105 that supports relay design for sidelink communications using network coding in accordance with aspects of the present disclosure. The device 1105 may be an example of aspects of a device 1005, relay 155, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may provide a means for receiving information such as packets, user data, or control information associated with various information channels (e.g., control channels, data channels, and information related to relay design for sidelink communications using network coding, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of means for performing various aspects of techniques as described herein The communications manager 1115 may be an example of aspects of the communications manager 1015 as described herein. For example, the communications manager 1115 may include a sidelink communications manager 1120, a feedback determination manager 1125, and a downlink communications manager 1130. The communications manager 1115 may be an example of aspects of the communications manager 1310 described herein.

The sidelink communications manager 1120 may provide or support a means for receiving, from a first UE of a set of UEs configured for UE-to-UE sidelink communications, a first subset of network coded packets in a first sidelink communication that is transmitted from the first UE to other UEs of the set of UEs. The feedback determination manager 1125 may provide or support a means for receiving, from a second UE of the set of UEs, a feedback report for the first subset of network coded packets that indicates unsuccessful receipt of at least a first packet at the second UE. The downlink communications manager 1130 may provide or support a means for transmitting, responsive to the feedback report, a second communication to the second UE that includes information associated with the first packet to the second UE.

The transmitter 1135 may provide a means for transmitting signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
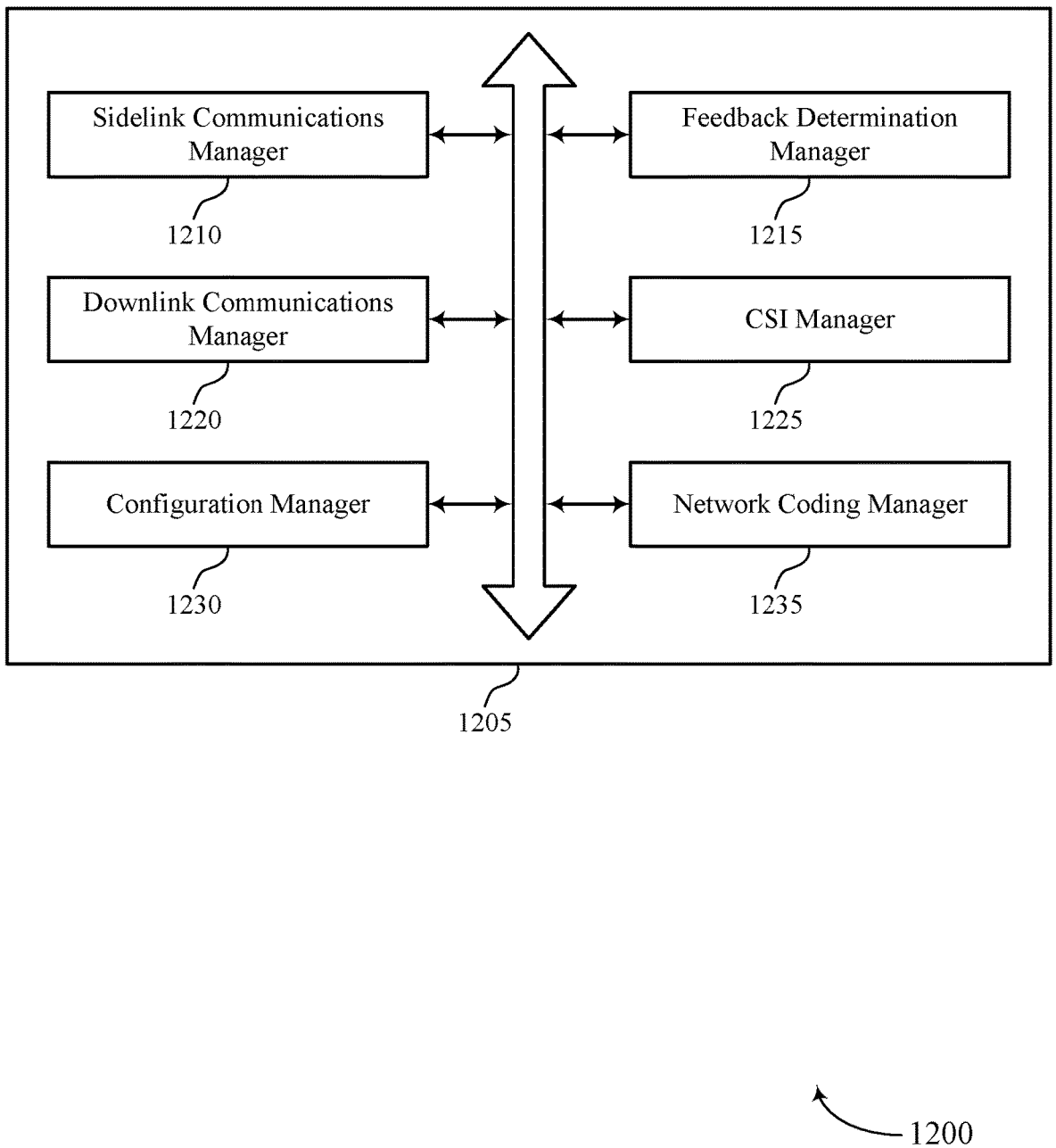
FIG. 12 shows a block diagram of a communications manager that supports relay design for sidelink communications using network coding in accordance with aspects of the present disclosure.

FIG. 12 shows a block diagram 1200 of a communications manager 1205 that supports relay design for sidelink communications using network coding in accordance with aspects of the present disclosure. The communications manager 1205 may be an example of aspects of a communications manager 1015, a communications manager 1115, or a communications manager 1310 described herein. The communications manager 1205 may include a sidelink communications manager 1210, a feedback determination manager 1215, a downlink communications manager 1220, a CSI manager 1225, a configuration manager 1230, and a network coding manager 1235. Each of these modules may communicate, directly or indirectly, with one another (e.g., via one or more buses).

The sidelink communications manager 1210 may provide or support a means for receiving, from a first UE of a set of UEs configured for UE-to-UE sidelink communications, a first subset of network coded packets in a first sidelink communication that is transmitted from the first UE to other UEs of the set of UEs. In some examples, the sidelink communications manager 1210 may receive, from the first UE, a second subset of network coded packets in a second sidelink communication.

The feedback determination manager 1215 may provide or support a means for receiving, from a second UE of the set of UEs, a feedback report for the first subset of network coded packets that indicates unsuccessful receipt of at least a first packet at the second UE. In some examples, the feedback determination manager 1215 may receive one or more of a PDCP status report, an RLC status report, a MAC HARQ feedback transmission, or any combinations thereof. In some examples, the feedback determination manager 1215 may determine a negative acknowledgment for at least the first packet based on the feedback report and a network coding algorithm used to encode the first subset of network coded packets. In some examples, the feedback determination manager 1215 may receive, from the second UE, second feedback for the second communication and the second sidelink communication.

The downlink communications manager 1220 may provide or support a means for transmitting, responsive to the feedback report, a second communication to the second UE that includes information associated with the first packet to the second UE. In some examples, the downlink communications manager 1220 may retransmit one or more packets of the first sidelink communication or the second sidelink communication based on one or more feedback reports received from one or more of the set of UEs.

The CSI manager 1225 may provide or support a means for receiving channel information associated with the second UE with the feedback report. In some examples, the CSI manager 1225 may modify a modulation and encoding scheme for the second communication with the second UE based on the channel information. In some cases, the channel information is determined based on one or more of a channel state information reference signal or a demodulation reference signal transmitted by the first UE.

The configuration manager 1230 may provide or support a means for receiving, from a base station, configuration information that indicates one or more of a network coding algorithm for the network coded packets, an encoding function or matrix for the network coded packets, a number of decoding iterations that may be performed for the network coded packets, a timing synchronization for sidelink communications, or any combinations thereof. In some cases, the configuration information is provided by the base station via one or more of RRC signaling, a MAC-CE, DCI, or any combinations thereof. In some cases, the node is a relay node or an RSU in a C-V2X sidelink communication system.

The network coding manager 1235 may provide or support a means for decoding one or more source packets based on a network coding algorithm and the first subset of network coded packets. In some examples, the network coding manager 1235 may determine that at least one source packet is unacknowledged at the second UE based on the network coding algorithm being unable to recover the at least one source packet from acknowledged network coded packets of the first subset of network coded packets. In some examples, the network coding manager 1235 may determine to retransmit one or more network coded packets based on the at least one source packet. In some examples, the network coding manager 1235 may encode one or more new network coded packets based on the network coding algorithm and the at least one source packet. In some examples, the network coding manager 1235 may transmit the one or more new network coded packets in the second communication.

In some cases, the first packet is a network coded packet, and where the second communication includes a retransmission of the network coded packet. In some cases, the first packet is a network coded packet, and where the second communication includes a retransmission of the network coded packet and one or more new network coded packets that include one or more source packets associated with the first packet based on a network coding algorithm to encode the one or more source packets.

Figure 13:
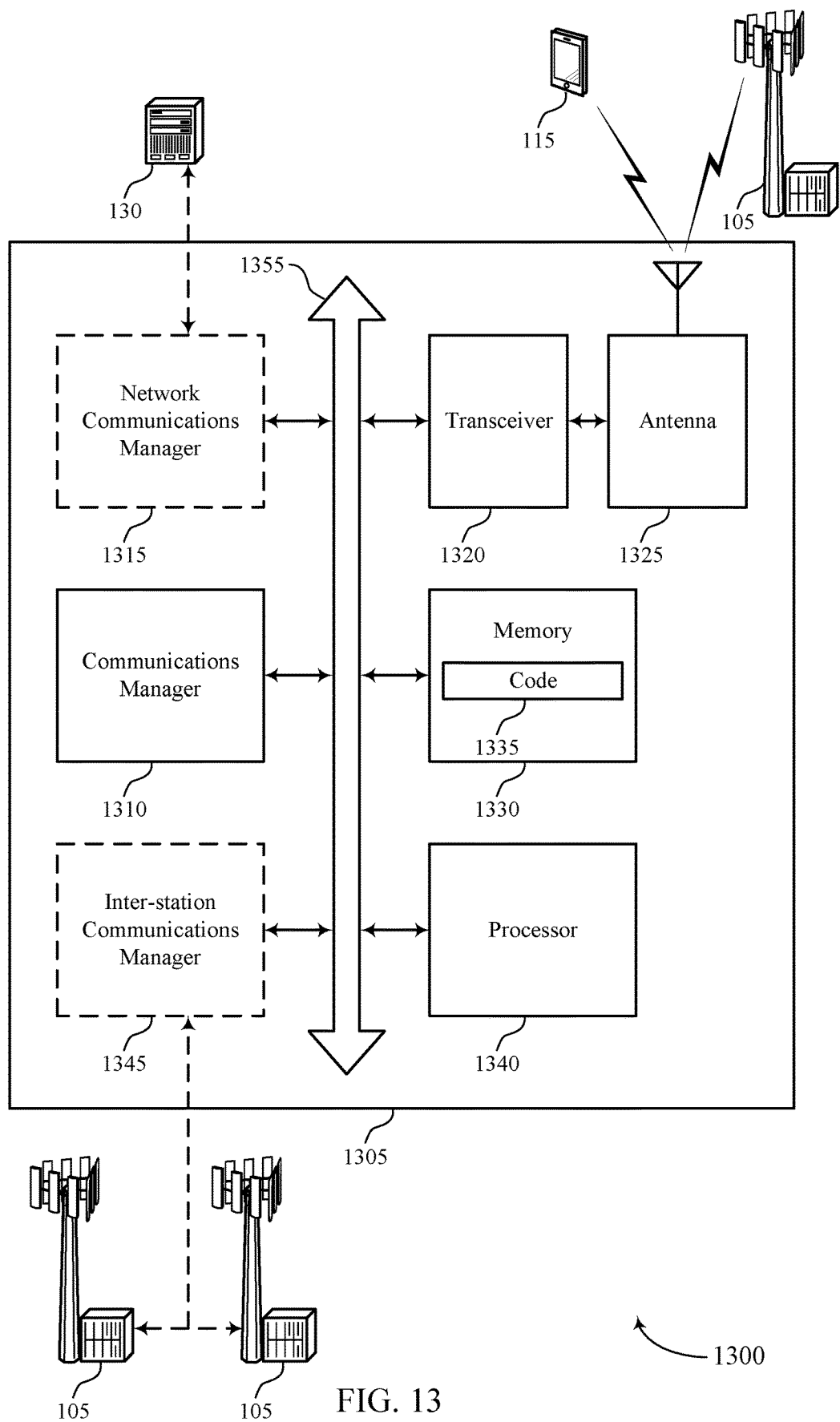
FIG. 13 shows a diagram of a system including a device that supports relay design for sidelink communications using network coding in accordance with aspects of the present disclosure.

FIG. 13 shows a diagram of a system 1300 including a device 1305 that supports relay design for sidelink communications using network coding in accordance with aspects of the present disclosure. The device 1305 may be an example of or include the components of device 1005, device 1105, relay 155, or a base station 105 as described herein. The device 1305 may include components for bi-directional voice and data communications including components for transmitting and receiving communications, including a communications manager 1310, an optional network communications manager 1315 (e.g., in cases where the device 1305 is coupled with a network), a transceiver 1320, an antenna 1325, memory 1330, a processor 1340, and an optional inter-station communications manager 1345 (e.g., in cases where the device 1305 is a base station). These components may be in electronic communication via one or more buses (e.g., bus 1355).

The communications manager 1310 may provide or support a means for receiving, from a first UE of a set of UEs configured for UE-to-UE sidelink communications, a first subset of network coded packets in a first sidelink communication that is transmitted from the first UE to other UEs of the set of UEs. The communications manager 1310 may provide or support a means for receiving, from a second UE of the set of UEs, a feedback report for the first subset of network coded packets that indicates unsuccessful receipt of at least a first packet at the second UE. The communications manager 1310 may also provide or support a means for transmitting, responsive to the feedback report, a second communication to the second UE that includes information associated with the first packet to the second UE.

The network communications manager 1315, when present, may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting relay design for sidelink communications using network coding).

The inter-station communications manager 1345, when present, may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
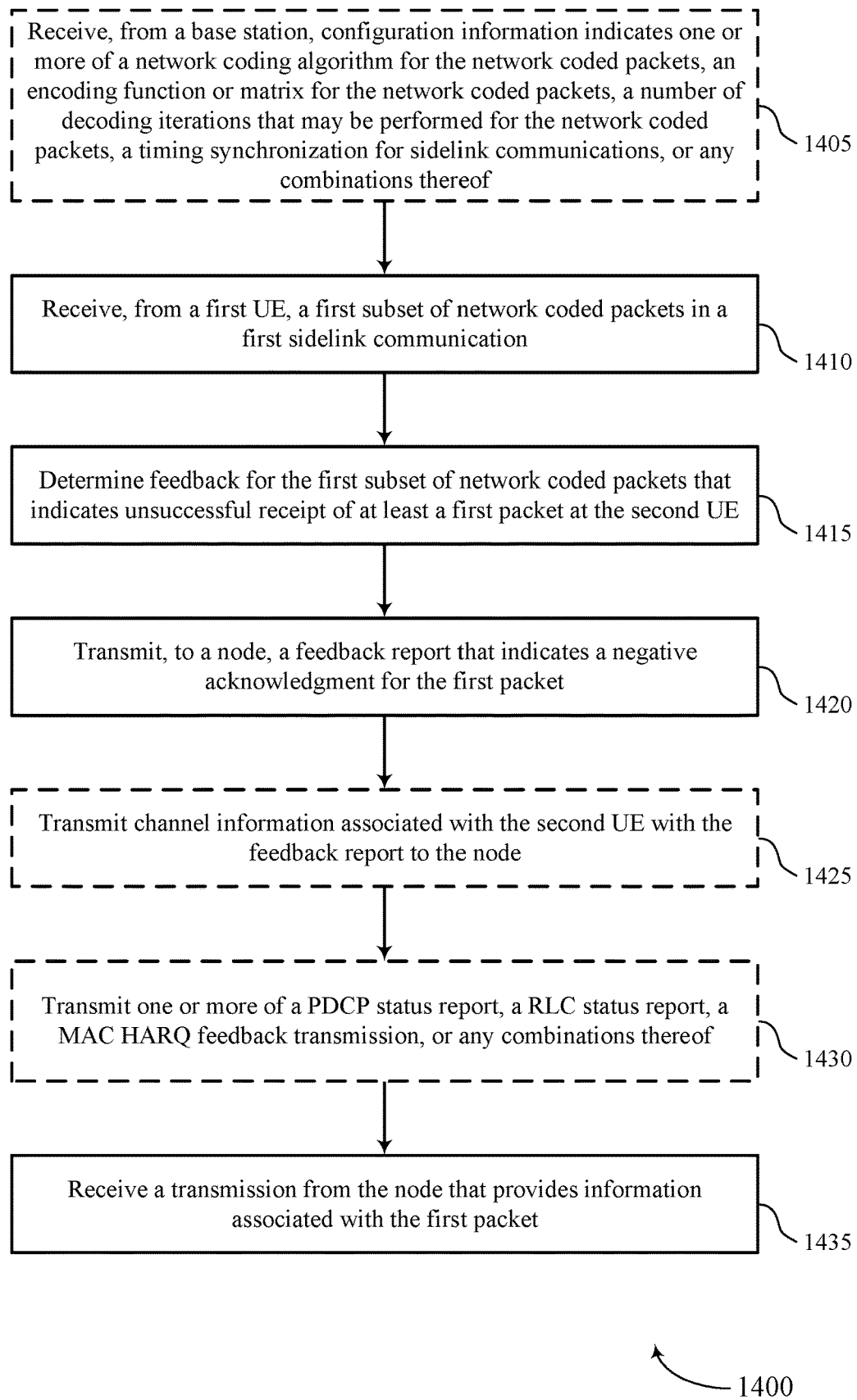
FIGS. 14 through 18 show flowcharts illustrating methods that support relay design for sidelink communications using network coding in accordance with aspects of the present disclosure.

FIG. 14 shows a flowchart illustrating a method 1400 that supports relay design for sidelink communications using network coding in accordance with aspects of the present disclosure. The operations of method 1400 may be implemented by a UE 115 (e.g., a second UE) or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

Optionally, at 1405, the second UE may receive, from a base station, configuration information indicates one or more of a network coding algorithm for the network coded packets, an encoding function or matrix for the network coded packets, a number of decoding iterations that may be performed for the network coded packets, a timing synchronization for sidelink communications, or any combinations thereof. The operations of 1405 may be performed according to the methods described herein. In some examples, aspects of the operations of 1405 may be performed by a configuration manager as described with reference to FIGS. 6 through 9.

At 1410, the second UE may receive, from a first UE, a first subset of network coded packets in a first sidelink communication. The operations of 1410 may be performed according to the methods described herein. In some examples, aspects of the operations of 1410 may be performed by a sidelink communications manager as described with reference to FIGS. 6 through 9.

At 1415, the second UE may determine feedback for the first subset of network coded packets that indicates unsuccessful receipt of at least a first packet at the second UE. The operations of 1415 may be performed according to the methods described herein. In some examples, aspects of the operations of 1415 may be performed by a network coding manager as described with reference to FIGS. 6 through 9.

At 1420, the second UE may transmit, to a node, a feedback report that indicates a negative acknowledgment for the first packet. The operations of 1420 may be performed according to the methods described herein. In some examples, aspects of the operations of 1420 may be performed by a feedback transmission manager as described with reference to FIGS. 6 through 9.

Optionally, at 1425, the second UE may transmit channel information associated with the second UE with the feedback report to the node. The operations of 1425 may be performed according to the methods described herein. In some examples, aspects of the operations of 1425 may be performed by a CSI manager as described with reference to FIGS. 6 through 9. In some cases, the channel information is determined based on one or more of a channel state information reference signal or a demodulation reference signal transmitted by the first UE.

Optionally, at 1430, the second UE may transmit the feedback report in one or more of a PDCP status report, an RLC status report, a MAC HARQ feedback transmission, or any combinations thereof. The operations of 1430 may be performed according to the methods described herein. In some examples, aspects of the operations of 1430 may be performed by a feedback transmission manager as described with reference to FIGS. 6 through 9.

At 1435, the UE or base station may receive a transmission from the node that provides information associated with the first packet. The operations of 1435 may be performed according to the methods described herein. In some examples, aspects of the operations of 1435 may be performed by a downlink communications manager as described with reference to FIGS. 6 through 9.

Figure 15:
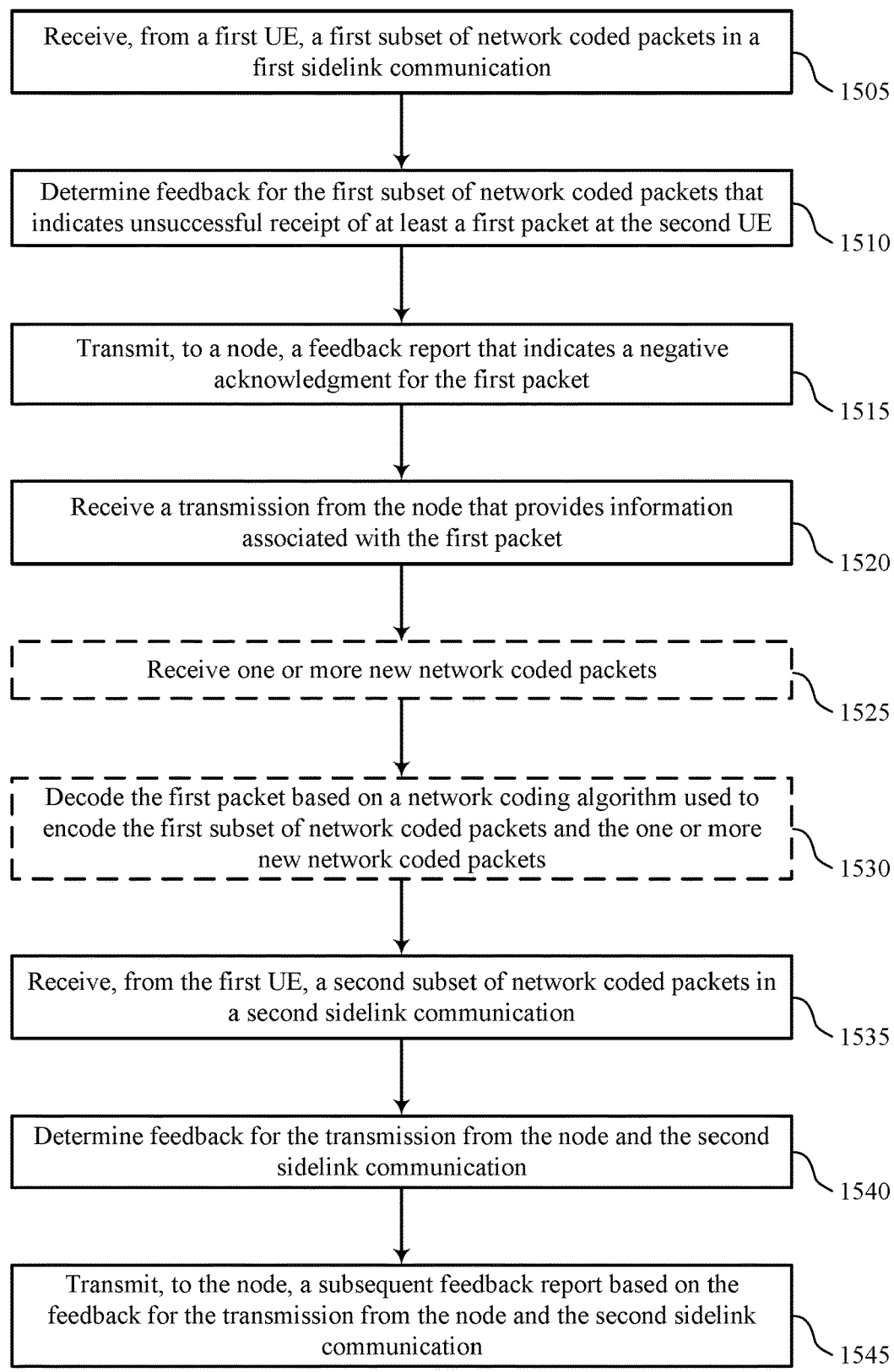

FIG. 15 shows a flowchart illustrating a method 1500 that supports relay design for sidelink communications using network coding in accordance with aspects of the present disclosure. The operations of method 1500 may be implemented by a second UE 115 or its components as described herein. For example, the operations of method 1500 may be performed by a communications manager as described with reference to FIGS. 6 through 9. In some examples, a UE may execute a set of instructions to control the functional elements of the second UE to perform the functions described herein. Additionally or alternatively, a UE or base station may perform aspects of the functions described herein using special-purpose hardware.

At 1505, the second UE may receive, from a first UE, a first subset of network coded packets in a first sidelink communication. The operations of 1505 may be performed according to the methods described herein. In some examples, aspects of the operations of 1505 may be performed by a sidelink communications manager as described with reference to FIGS. 6 through 9.

At 1510, the second UE may determine feedback for the first subset of network coded packets that indicates unsuccessful receipt of at least a first packet at the second UE. The operations of 1510 may be performed according to the methods described herein. In some examples, aspects of the operations of 1510 may be performed by a network coding manager as described with reference to FIGS. 6 through 9.

At 1515, the second UE may transmit, to a node, a feedback report that indicates a negative acknowledgment for the first packet. The operations of 1515 may be performed according to the methods described herein. In some examples, aspects of the operations of 1515 may be performed by a feedback transmission manager as described with reference to FIGS. 6 through 9.

At 1520, the second UE may receive a transmission from the node that provides information associated with the first packet. The operations of 1520 may be performed according to the methods described herein. In some examples, aspects of the operations of 1520 may be performed by a downlink communications manager as described with reference to FIGS. 6 through 9.

Optionally, at 1525, the second UE may receive one or more new network coded packets. The operations of 1525 may be performed according to the methods described herein. In some examples, aspects of the operations of 1525 may be performed by a network coding manager as described with reference to FIGS. 6 through 9.

Optionally, at 1530, the second UE may decode the first packet based on a network coding algorithm used to encode the first subset of network coded packets and the one or more new network coded packets. The operations of 1530 may be performed according to the methods described herein. In some examples, aspects of the operations of 1530 may be performed by a network coding manager as described with reference to FIGS. 6 through 9.

At 1535, the second UE may receive, from the first UE, a second subset of network coded packets in a second sidelink communication. The operations of 1535 may be performed according to the methods described herein. In some examples, aspects of the operations of 1535 may be performed by a sidelink communications manager as described with reference to FIGS. 6 through 9.

At 1540, the second UE may determine feedback for the transmission from the node and the second sidelink communication. The operations of 1540 may be performed according to the methods described herein. In some examples, aspects of the operations of 1540 may be performed by a network coding manager as described with reference to FIGS. 6 through 9.

At 1545, the second UE may transmit, to the node, a subsequent feedback report based on the feedback for the transmission from the node and the second sidelink communication. The operations of 1545 may be performed according to the methods described herein. In some examples, aspects of the operations of 1545 may be performed by a feedback transmission manager as described with reference to FIGS. 6 through 9.

Figure 16:
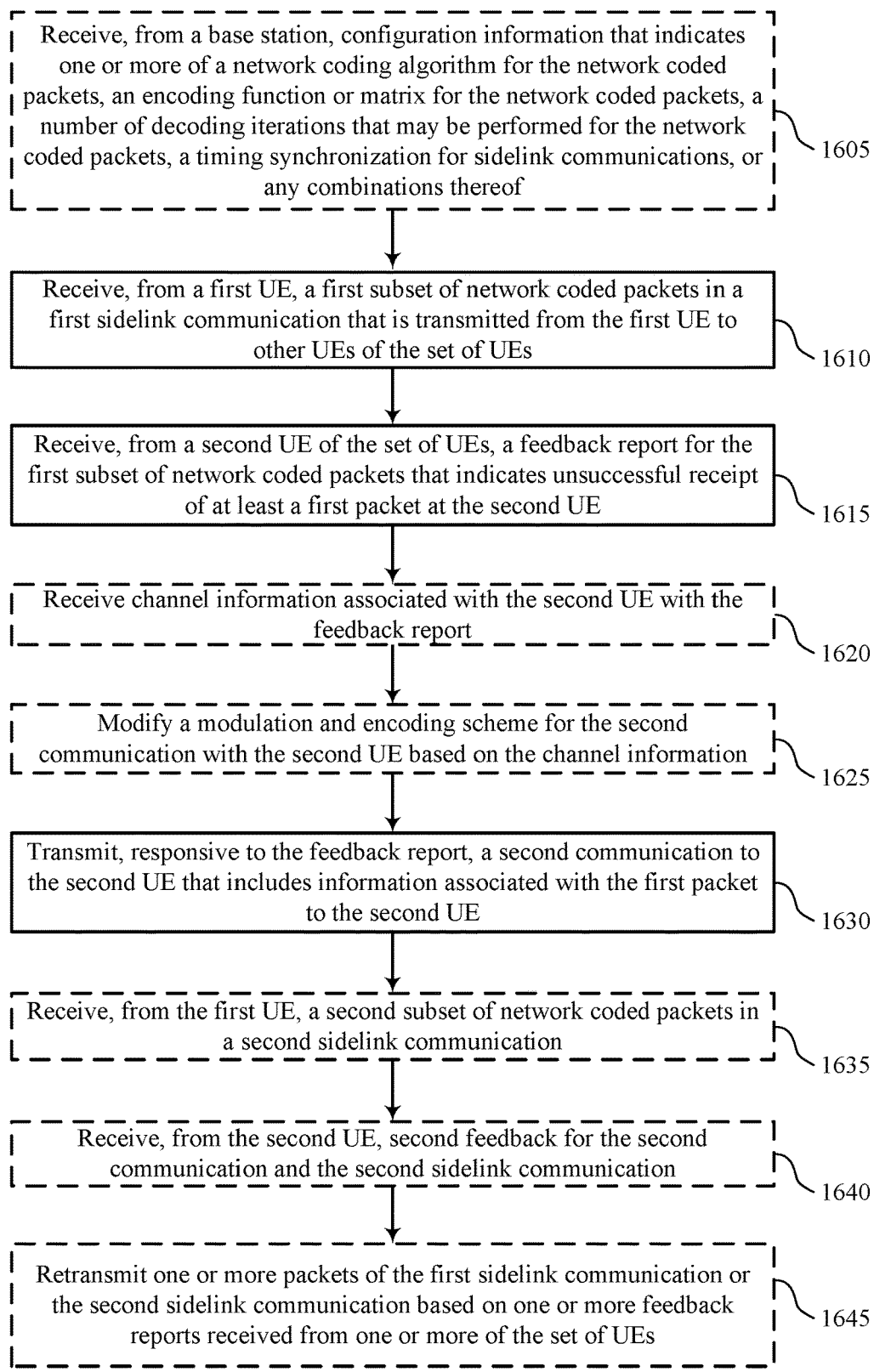

FIG. 16 shows a flowchart illustrating a method 1600 that supports relay design for sidelink communications using network coding in accordance with aspects of the present disclosure. The operations of method 1600 may be implemented by a node or base station or its components as described herein. For example, the operations of method 1600 may be performed by a communications manager as described with reference to FIGS. 10 through 13. In some examples, a node or base station may execute a set of instructions to control the functional elements of the node or base station to perform the functions described herein. Additionally or alternatively, a node or base station may perform aspects of the functions described herein using special-purpose hardware.

Optionally, at 1605, the node or base station may receive, from a serving base station, configuration information that indicates one or more of a network coding algorithm for the network coded packets, an encoding function or matrix for the network coded packets, a number of decoding iterations that may be performed for the network coded packets, a timing synchronization for sidelink communications, or any combinations thereof. The operations of 1605 may be performed according to the methods described herein. In some examples, aspects of the operations of 1605 may be performed by a configuration manager as described with reference to FIGS. 10 through 13.

At 1610, the node or base station may receive, from a first UE of a set of UEs configured for UE-to-UE sidelink communications, a first subset of network coded packets in a first sidelink communication that is transmitted from the first UE to other UEs of the set of UEs. The operations of 1610 may be performed according to the methods described herein. In some examples, aspects of the operations of 1610 may be performed by a sidelink communications manager as described with reference to FIGS. 10 through 13.

At 1615, the node or base station may receive, from a second UE of the set of UEs, a feedback report for the first subset of network coded packets that indicates unsuccessful receipt of at least a first packet at the second UE. The operations of 1615 may be performed according to the methods described herein. In some examples, aspects of the operations of 1615 may be performed by a feedback determination manager as described with reference to FIGS. 10 through 13.

Optionally, at 1620, the node or base station may receive channel information associated with the second UE with the feedback report. The operations of 1620 may be performed according to the methods described herein. In some examples, aspects of the operations of 1620 may be performed by a CSI manager as described with reference to FIGS. 10 through 13.

Optionally, at 1625, the node or base station may modify a modulation and encoding scheme for the second communication with the second UE based on the channel information. The operations of 1625 may be performed according to the methods described herein. In some examples, aspects of the operations of 1625 may be performed by a CSI manager as described with reference to FIGS. 10 through 13.

At 1630, the node or base station may transmit, responsive to the feedback report, a second communication to the second UE that includes information associated with the first packet to the second UE. The operations of 1630 may be performed according to the methods described herein. In some examples, aspects of the operations of 1630 may be performed by a downlink communications manager as described with reference to FIGS. 10 through 13.

Optionally, at 1635, the node or base station may receive, from the first UE, a second subset of network coded packets in a second sidelink communication. The operations of 1635 may be performed according to the methods described herein. In some examples, aspects of the operations of 1635 may be performed by a sidelink communications manager as described with reference to FIGS. 10 through 13.

Optionally, at 1640, the node or base station may receive, from the second UE, second feedback for the second communication and the second sidelink communication. The operations of 1640 may be performed according to the methods described herein. In some examples, aspects of the operations of 1640 may be performed by a feedback determination manager as described with reference to FIGS. 10 through 13.

Optionally, at 1645, the node or base station may retransmit one or more packets of the first sidelink communication or the second sidelink communication based on one or more feedback reports received from one or more of the set of UEs. The operations of 1645 may be performed according to the methods described herein. In some examples, aspects of the operations of 1645 may be performed by a downlink communications manager as described with reference to FIGS. 10 through 13.

Figure 17:
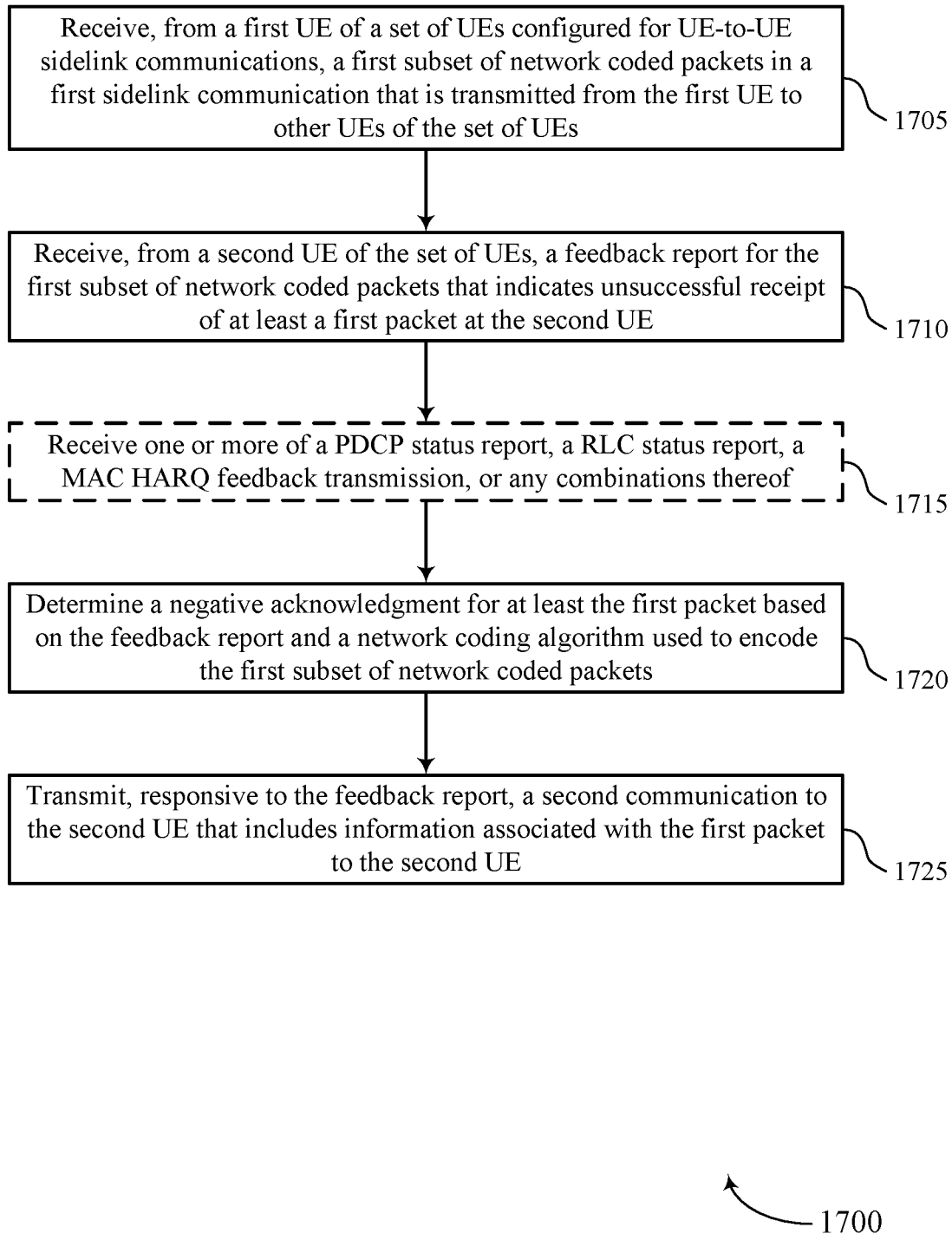

FIG. 17 shows a flowchart illustrating a method 1700 that supports relay design for sidelink communications using network coding in accordance with aspects of the present disclosure. The operations of method 1700 may be implemented by a node or base station or its components as described herein. For example, the operations of method 1700 may be performed by a communications manager as described with reference to FIGS. 10 through 13. In some examples, a node or base station may execute a set of instructions to control the functional elements of the node or base station to perform the functions described herein. Additionally or alternatively, a node or base station may perform aspects of the functions described herein using special-purpose hardware.

At 1705, the node or base station may receive, from a first UE of a set of UEs configured for UE-to-UE sidelink communications, a first subset of network coded packets in a first sidelink communication that is transmitted from the first UE to other UEs of the set of UEs. The operations of 1705 may be performed according to the methods described herein. In some examples, aspects of the operations of 1705 may be performed by a sidelink communications manager as described with reference to FIGS. 10 through 13.

At 1710, the node or base station may receive, from a second UE of the set of UEs, a feedback report for the first subset of network coded packets that indicates unsuccessful receipt of at least a first packet at the second UE. The operations of 1710 may be performed according to the methods described herein. In some examples, aspects of the operations of 1710 may be performed by a feedback determination manager as described with reference to FIGS. 10 through 13.

Optionally, at 1715, the node or base station may receive one or more of a packet data convergence protocol (PDCP) status report, an RLC status report, a medium access control (MAC) hybrid acknowledgment repeat request (HARQ) feedback transmission, or any combinations thereof. The operations of 1715 may be performed according to the methods described herein. In some examples, aspects of the operations of 1715 may be performed by a feedback determination manager as described with reference to FIGS. 10 through 13.

At 1720, the node or base station may determine a negative acknowledgment for at least the first packet based on the feedback report and a network coding algorithm used to encode the first subset of network coded packets. The operations of 1720 may be performed according to the methods described herein. In some examples, aspects of the operations of 1720 may be performed by a feedback determination manager as described with reference to FIGS. 10 through 13.

At 1725, the node or base station may transmit, responsive to the feedback report, a second communication to the second UE that includes information associated with the first packet to the second UE. The operations of 1725 may be performed according to the methods described herein. In some examples, aspects of the operations of 1725 may be performed by a downlink communications manager as described with reference to FIGS. 10 through 13.

Figure 18:
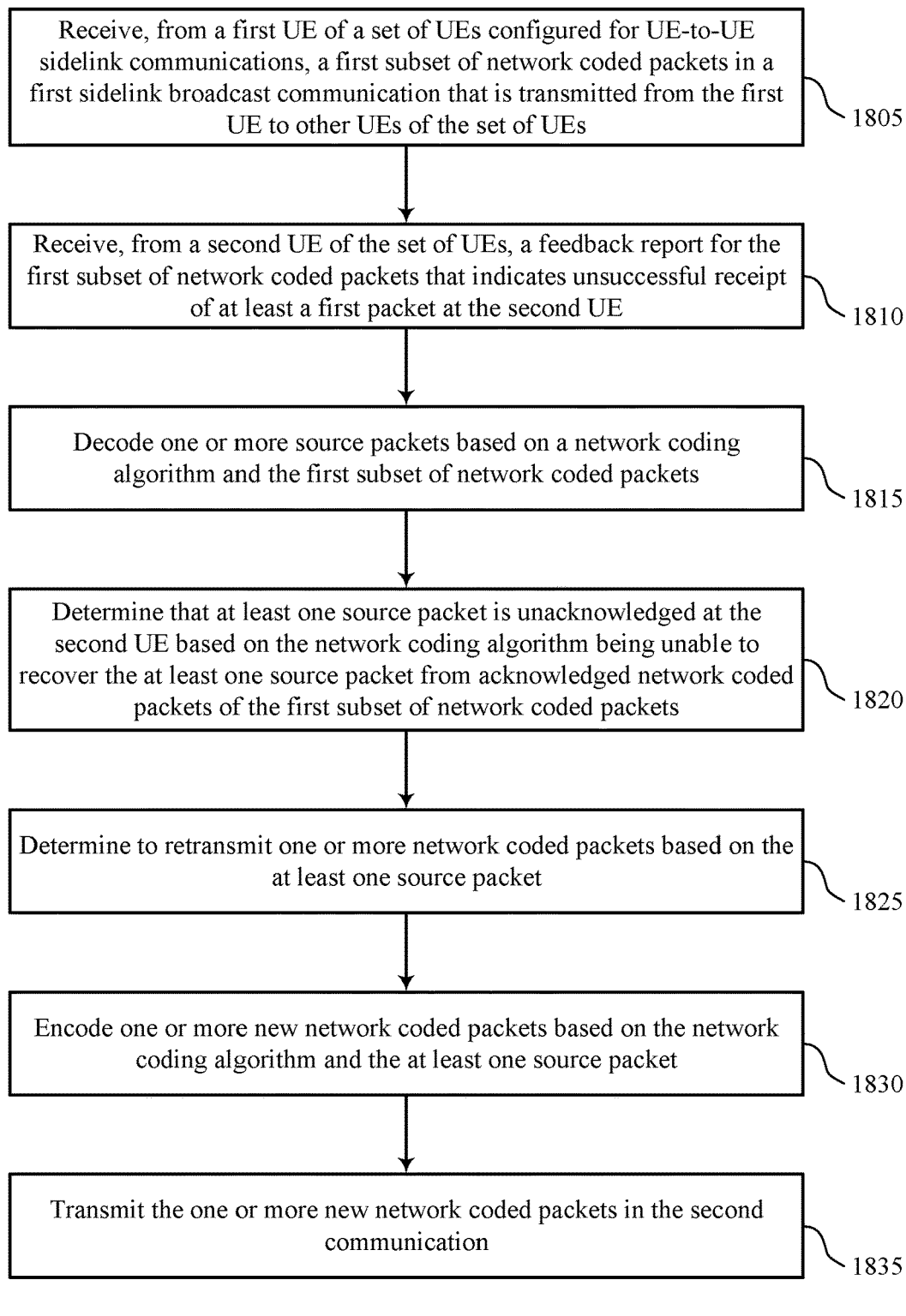

FIG. 18 shows a flowchart illustrating a method 1800 that supports relay design for sidelink communications using network coding in accordance with aspects of the present disclosure. The operations of method 1800 may be implemented by a node or base station or its components as described herein. For example, the operations of method 1800 may be performed by a communications manager as described with reference to FIGS. 10 through 13. In some examples, a node or base station may execute a set of instructions to control the functional elements of the node or base station to perform the functions described herein. Additionally or alternatively, a node or base station may perform aspects of the functions described herein using special-purpose hardware.

At 1805, the node or base station may receive, from a first UE of a set of UEs configured for UE-to-UE sidelink communications, a first subset of network coded packets in a first sidelink communication that is transmitted from the first UE to other UEs of the set of UEs. The operations of 1805 may be performed according to the methods described herein. In some examples, aspects of the operations of 1805 may be performed by a sidelink communications manager as described with reference to FIGS. 10 through 13.

At 1810, the node or base station may receive, from a second UE of the set of UEs, a feedback report for the first subset of network coded packets that indicates unsuccessful receipt of at least a first packet at the second UE. The operations of 1810 may be performed according to the methods described herein. In some examples, aspects of the operations of 1810 may be performed by a feedback determination manager as described with reference to FIGS. 10 through 13.

At 1815, the node or base station may decode one or more source packets based on a network coding algorithm and the first subset of network coded packets. The operations of 1815 may be performed according to the methods described herein. In some examples, aspects of the operations of 1815 may be performed by a network coding manager as described with reference to FIGS. 10 through 13.

At 1820, the node or base station may determine that at least one source packet is unacknowledged at the second UE based on the network coding algorithm being unable to recover the at least one source packet from acknowledged network coded packets of the first subset of network coded packets. The operations of 1820 may be performed according to the methods described herein. In some examples, aspects of the operations of 1820 may be performed by a network coding manager as described with reference to FIGS. 10 through 13.

At 1825, the node or base station may determine to retransmit one or more network coded packets based on the at least one source packet. The operations of 1825 may be performed according to the methods described herein. In some examples, aspects of the operations of 1825 may be performed by a network coding manager as described with reference to FIGS. 10 through 13.

At 1830, the node or base station may encode one or more new network coded packets based on the network coding algorithm and the at least one source packet. The operations of 1830 may be performed according to the methods described herein. In some examples, aspects of the operations of 1830 may be performed by a network coding manager as described with reference to FIGS. 10 through 13.

At 1835, the node or base station may transmit the one or more new network coded packets in the second communication. The operations of 1835 may be performed according to the methods described herein. In some examples, aspects of the operations of 1835 may be performed by a network coding manager as described with reference to FIGS. 10 through 13.

The following provides an overview of examples of the present disclosure:

Example 1: A method for wireless communication at a second UE, comprising: receiving, from a first UE, a first subset of network coded packets in a first sidelink communication; determining feedback for the first subset of network coded packets that indicates unsuccessful receipt of at least a first packet at the second UE; transmitting, to a node, a feedback report that indicates a negative acknowledgment for the first packet; and receiving a transmission from the node that provides information associated with the first packet. In some cases, the first sidelink communication comprises at least one of a sidelink broadcast communication, a sidelink multicast communication, or a sidelink groupcast communication.

Example 2: The method of example 1, further comprising: transmitting channel information associated with the second UE with the feedback report to the node.

Example 3: The method of example 2, wherein the channel information is determined based at least in part on one or more of a channel state information reference signal or a demodulation reference signal transmitted by the first UE.

Example 4: The method of any one of examples 1 through 3, wherein the transmitting the feedback report comprises: transmitting one or more of a PDCP status report, an RLC status report, a MAC HARQ feedback transmission, or any combinations thereof.

Example 5: The method of any one of examples 1 through 4, further comprising: receiving, from a base station, configuration information indicates one or more of a network coding algorithm for the network coded packets, an encoding function or matrix for the network coded packets, a number of decoding iterations that may be performed for the network coded packets, a timing synchronization for sidelink communications, or any combinations thereof.

Example 6: The method of example 5, wherein the configuration information is provided by the base station via one or more of RRC signaling, a MAC-CE, DCI, or any combinations thereof.

Example 7: The method of any one of examples 1 through 6, wherein the node is a relay node or an RSU in a C-V2X sidelink communication system.

Example 8: The method of any one of examples 1 through 7, wherein the first packet is a network coded packet, and wherein the transmission from the node is a retransmission of the network coded packet.

Example 9: The method of any one of examples 1 through 8, further comprising: decoding one or more source packets based on a network coding algorithm and the received first subset of network coded packets.

Example 10: The method of any one of examples 1 through 9, wherein the receiving the transmission from the node comprises: receiving one or more new network coded packets; and decoding the first packet based at least in part on a network coding algorithm used to encode the first subset of network coded packets and the one or more new network coded packets.

Example 11: The method of any one of examples 1 through 10, further comprising: receiving, from the first UE, a second subset of network coded packets in a second sidelink communication; determining feedback for the transmission from the node and the second sidelink communication; and transmitting, to the node, a subsequent feedback report based at least in part on the feedback for the transmission from the node and the second sidelink communication. In some cases, the second sidelink communication comprises at least one of a sidelink broadcast communication, a sidelink multicast communication, or a sidelink groupcast communication.

Example 12: The method of any one of examples 1 through 11, wherein the first packet is a network coded packet, and wherein the transmission from the node includes one or more new network coded packets that include one or more source packets associated with the first packet based at least in part on a network coding algorithm to encode the one or more source packets.

Example 13: A method for wireless communication at a node, comprising: receiving, from a first UE of a plurality of UEs configured for UE-to-UE sidelink communications, a first subset of network coded packets in a first sidelink communication that is transmitted from the first UE to other UEs of the plurality of UEs; receiving, from a second UE of the plurality of UEs, a feedback report for the first subset of network coded packets that indicates unsuccessful receipt of at least a first packet at the second UE; and transmitting, responsive to the feedback report, a second communication to the second UE that includes information associated with the first packet. In some cases, the first sidelink communication comprises at least one of a sidelink broadcast communication, a sidelink multicast communication, or a sidelink groupcast communication.

Example 14: The method of example 13, further comprising: receiving channel information associated with the second UE with the feedback report; and modifying a modulation and encoding scheme for the second communication with the second UE based at least in part on the channel information.

Example 15: The method of example 14, wherein the channel information is determined based at least in part on one or more of a channel state information reference signal or a demodulation reference signal transmitted by the first UE.

Example 16: The method of any one of examples 13 through 15, wherein the receiving the feedback report comprises: receiving one or more of a PDCP status report, an RLC status report, a MAC HARQ feedback transmission, or any combinations thereof and determining a negative acknowledgment for at least the first packet based at least in part on the feedback report and a network coding algorithm used to encode the first subset of network coded packets.

Example 17: The method of any one of examples 13 through 16, further comprising: receiving, from a base station, configuration information that indicates one or more of a network coding algorithm for the network coded packets, an encoding function or matrix for the network coded packets, a number of decoding iterations that may be performed for the network coded packets, a timing synchronization for sidelink communications, or any combinations thereof.

Example 18: The method of example 17, wherein the configuration information is provided by the base station via one or more of RRC signaling, a MAC-CE, DCI, or any combinations thereof.

Example 19: The method of any one of examples 13 through 18, wherein the node is a relay node or an RSU in a C-V2X sidelink communication system.

Example 20: The method of any one of examples 13 through 19, wherein the first packet is a network coded packet, and wherein the second communication includes a retransmission of the network coded packet.

Example 21: The method of any one of examples 13 through 20, further comprising: decoding one or more source packets based on a network coding algorithm and the first subset of network coded packets; determining that at least one source packet is unacknowledged at the second UE based at least in part on the network coding algorithm being unable to recover the at least one source packet from acknowledged network coded packets of the first subset of network coded packets; and determining to retransmit one or more network coded packets based at least in part on the at least one source packet.

Example 22: The method of example 21, further comprising: encoding one or more new network coded packets based on the network coding algorithm and the at least one source packet; and transmitting the one or more new network coded packets in the second communication.

Example 23: The method of any one of examples 13 through 22, further comprising: receiving, from the first UE, a second subset of network coded packets in a second sidelink communication; receiving, from the second UE, second feedback for the second communication and the second sidelink communication; and retransmitting one or more packets of the first sidelink communication or the second sidelink communication based at least in part on one or more feedback reports received from one or more of the plurality of UEs. In some cases, the second sidelink communication comprises at least one of a sidelink broadcast communication, a sidelink multicast communication, or a sidelink groupcast communication.

Example 24: The method of any one of examples 13 through 23, wherein the first packet is a network coded packet, and wherein the second communication includes a retransmission of the network coded packet and one or more new network coded packets that include one or more source packets associated with the first packet based at least in part on a network coding algorithm to encode the one or more source packets.

Example 25: An apparatus for wireless communication comprising at least one means for performing a method of any one of examples 1 through 12.

Example 26: An apparatus for wireless communication comprising a processor and memory coupled to the processor, the processor and memory configured to perform a method of any one of examples 1 through 12.

Example 27: A non-transitory computer-readable medium storing code for wireless communication, the code comprising instructions executable by a processor to perform a method of any one of examples 1 through 12.

Example 28: An apparatus for wireless communication comprising at least one means for performing a method of any one of examples 13 through 24.

Example 29: An apparatus for wireless communication comprising a processor and memory coupled to the processor, the processor and memory configured to perform a method of any one of examples 13 through 24.

Example 30: A non-transitory computer-readable medium storing code for wireless communication, the code comprising instructions executable by a processor to perform a method of any one of examples 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a second user equipment (UE), comprising:
   one or more memories storing processor-executable code; and
   one or more processors coupled with the one or more memories and operable individually or collectively to execute the code to cause the second UE to:
   receive, from a first UE, a first subset of network coded packets in a first sidelink communication;
   transmit, to a node, a feedback report corresponding to feedback for the first subset of network coded packets indicating unsuccessful receipt of at least a first packet at the second UE, wherein the feedback report indicates a negative acknowledgment for the first packet;
   transmit, to the node, channel information associated with the second UE with the feedback report; and
   receive a transmission from the node that provides information associated with the first packet.

2. The apparatus of claim 1, wherein the channel information comprises a channel state information report.

3. The apparatus of claim 1, wherein the channel information is determined based at least in part on one or more of a channel state information reference signal or a demodulation reference signal transmitted by the first UE.

4. The apparatus of claim 1, wherein the one or more processors are further operable individually or collectively to execute the code to cause the second UE to:
   transmit one or more of a packet data convergence protocol (PDCP) status report, a radio link control (RLC) status report, a medium access control (MAC) hybrid acknowledgment repeat request (HARD) feedback transmission, or any combinations thereof.

5. The apparatus of claim 1, wherein the one or more processors are further operable individually or collectively to execute the code to cause the second UE to:
   receive, from a base station, configuration information indicating one or more of a network coding algorithm for the network coded packets, an encoding function or matrix for the network coded packets, a number of decoding iterations that may be performed for the network coded packets, a timing synchronization for sidelink communications, or any combinations thereof.

6. The apparatus of claim 5, wherein the configuration information is provided by the base station via one or more of radio resource control (RRC) signaling, a medium access control (MAC) control element, downlink control information (DCI), or any combinations thereof.

7. The apparatus of claim 1, wherein the node is a roadside unit (RSU) in a cellular vehicle-to-everything (C-V2X) sidelink communication system.

8. The apparatus of claim 1, wherein the first packet is a network coded packet, and wherein the transmission from the node is a retransmission of the network coded packet.

9. The apparatus of claim 1, wherein the one or more processors are further operable individually or collectively to execute the code to cause the second UE to:
decode one or more source packets based on a network coding algorithm and the received first subset of network coded packets.

10. The apparatus of claim 1, wherein the one or more processors are further operable individually or collectively to execute the code to cause the second UE to:
receive one or more new network coded packets; and
decode the first packet based at least in part on a network coding algorithm used to encode the first subset of network coded packets and the one or more new network coded packets.

11. The apparatus of claim 1, wherein the one or more processors are further operable individually or collectively to execute the code to cause the second UE to:
receive, from the first UE, a second subset of network coded packets in a second sidelink communication;
determine feedback for the transmission from the node and the second sidelink communication; and
transmit, to the node, a subsequent feedback report based at least in part on the feedback for the transmission from the node and the second sidelink communication.

12. The apparatus of claim 1, wherein the first packet is a network coded packet, and wherein the transmission from the node includes one or more new network coded packets that include one or more source packets associated with the first packet based at least in part on a network coding algorithm to encode the one or more source packets.

13. The apparatus of claim 1, wherein the first sidelink communication comprises at least one of a sidelink broadcast communication, a sidelink multicast communication, or a sidelink groupcast communication.

14. An apparatus for wireless communication at a node, comprising:
one or more memories storing processor-executable code; and
one or more processors coupled with the one or more memories and individually or collectively operable to execute the code to cause the node to:
receive, from a first user equipment (UE) of a plurality of UEs configured for UE-to-UE sidelink communications, a first subset of network coded packets in a first sidelink communication that is transmitted from the first UE to other UEs of the plurality of UEs;
receive, from a second UE of the plurality of UEs, a feedback report for the first subset of network coded packets that indicates unsuccessful receipt of at least a first packet at the second UE;
receive, from the second UE, channel information associated with the second UE with the feedback report; and
transmit, responsive to the feedback report, a second communication to the second UE that includes information associated with the first packet.

15. The apparatus of claim 14, wherein the one or more processors are further operable individually or collectively to execute the code to cause the node to:
modify a modulation and encoding scheme for the second communication with the second UE based at least in part on the channel information.

16. The apparatus of claim 14, wherein the channel information is determined based at least in part on one or more of a channel state information reference signal or a demodulation reference signal transmitted by the first UE.

17. The apparatus of claim 14, wherein the one or more processors are further operable individually or collectively to execute the code to cause the node to:
receive one or more of a packet data convergence protocol (PDCP) status report, a radio link control (RLC) status report, a medium access control (MAC) hybrid acknowledgment repeat request (HARD) feedback transmission, or any combinations thereof; and
determine a negative acknowledgment for at least the first packet based at least in part on the feedback report and a network coding algorithm used to encode the first subset of network coded packets.

18. The apparatus of claim 14, wherein the one or more processors are further operable individually or collectively to execute the code to cause the node to:
receive, from a base station, configuration information that indicates one or more of a network coding algorithm for the network coded packets, an encoding function or matrix for the network coded packets, a number of decoding iterations that may be performed for the network coded packets, a timing synchronization for sidelink communications, or any combinations thereof.

19. The apparatus of claim 18, wherein the configuration information is provided by the base station via one or more of radio resource control (RRC) signaling, a medium access control (MAC) control element, downlink control information (DCI), or any combinations thereof.

20. The apparatus of claim 14, wherein the node is a roadside unit (RSU) in a cellular vehicle-to-everything (C-V2X) sidelink communication system.

21. The apparatus of claim 14, wherein the first packet is a network coded packet, and wherein the second communication includes a retransmission of the network coded packet.

22. The apparatus of claim 14, wherein the one or more processors are further operable individually or collectively to execute the code to cause the node to:
decode one or more source packets based on a network coding algorithm and the first subset of network coded packets;
determine that at least one source packet is unacknowledged at the second UE based at least in part on the network coding algorithm being unable to recover the at least one source packet from acknowledged network coded packets of the first subset of network coded packets; and
determine to retransmit one or more network coded packets based at least in part on the at least one source packet.

23. The apparatus of claim 22, wherein the one or more processors are further operable individually or collectively to execute the code to cause the node to:
- encode one or more new network coded packets based on the network coding algorithm and the at least one source packet; and
- transmit the one or more new network coded packets in the second communication.

24. The apparatus of claim 14, wherein the one or more processors are further operable individually or collectively to execute the code to cause the node to:
- receive, from the first UE, a second subset of network coded packets in a second sidelink communication;
- receive, from the second UE, second feedback for the second communication and the second sidelink communication; and
- retransmit one or more packets of the first sidelink communication or the second sidelink communication based at least in part on one or more feedback reports received from one or more of the plurality of UEs.

25. The apparatus of claim 14, wherein the first packet is a network coded packet, and wherein the second communication includes a retransmission of the network coded packet and one or more new network coded packets that include one or more source packets associated with the first packet based at least in part on a network coding algorithm to encode the one or more source packets.

26. The apparatus of claim 14, wherein the first sidelink communication comprises at least one of a sidelink broadcast communication, a sidelink multicast communication, or a sidelink groupcast communication.

27. A method for wireless communication at a second user equipment (UE), comprising:
- receiving, from a first UE, a first subset of network coded packets in a first sidelink communication;
- transmitting, to a node, a feedback report corresponding to feedback for the first subset of network coded packets indicating unsuccessful receipt of at least a first packet at the second UE, wherein the feedback report indicates a negative acknowledgment for the first packet;
- transmitting, to the node, channel information associated with the second UE with the feedback report; and
- receiving a transmission from the node that provides information associated with the first packet.

28. The method of claim 27, wherein the channel information comprises a channel state information report.

29. A method for wireless communication at a node, comprising:
- receiving, from a first user equipment (UE) of a plurality of UEs configured for UE-to-UE sidelink communications, a first subset of network coded packets in a first sidelink communication that is transmitted from the first UE to other UEs of the plurality of UEs;
- receiving, from a second UE of the plurality of UEs, a feedback report for the first subset of network coded packets that indicates unsuccessful receipt of at least a first packet at the second UE;
- receiving, from the second UE, channel information associated with the second UE with the feedback report; and
- transmitting, responsive to the feedback report, a second communication to the second UE that includes information associated with the first packet.

30. The method of claim 29, further comprising:
- modifying a modulation and encoding scheme for the second communication with the second UE based at least in part on the channel information.

* * * * *